(12) United States Patent
Mafune et al.

(10) Patent No.: US 7,550,037 B2
(45) Date of Patent: Jun. 23, 2009

(54) INK, INK JET RECORDING METHOD, INK CARTRIDGE, RECORDING UNIT AND INK JET RECORDING APPARATUS

(75) Inventors: Kumiko Mafune, Kawasaki (JP); Tomohiro Yamashita, Kawasaki (JP); Jun Yoshizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/136,393

(22) Filed: Jun. 10, 2008

(65) Prior Publication Data

US 2009/0011130 A1    Jan. 8, 2009

(30) Foreign Application Priority Data

Jul. 5, 2007    (JP)    ............... 2007-177459
May 30, 2008    (JP)    ............... 2008-142279

(51) Int. Cl.
*C09D 11/02*    (2006.01)
*B41J 2/01*    (2006.01)

(52) U.S. Cl. .................... 106/31.48; 347/100
(58) Field of Classification Search ............ 106/31.48, 106/31.5; 347/100
See application file for complete search history.

(56) References Cited

U.S. PATENT DOCUMENTS

| | | | | |
|---|---|---|---|---|
| 4,202,870 A | 5/1980 | Weber et al. | ................ | 423/630 |
| 4,242,271 A | 12/1980 | Weber et al. | .......... | 260/448 AD |
| 4,391,960 A | 7/1983 | Kleine et al. | .................. | 526/74 |
| 4,723,129 A | 2/1988 | Endo et al. | .................... | 346/1.1 |
| 4,740,796 A | 4/1988 | Endo et al. | .................... | 346/1.1 |
| 5,078,790 A | 1/1992 | Tochihara et al. | ............. | 106/20 |
| 5,080,716 A | 1/1992 | Aoki et al. | .................... | 106/20 |
| 5,091,009 A | 2/1992 | Nogami et al. | ........... | 106/287.1 |
| 5,131,949 A | 7/1992 | Tochihara et al. | ............. | 106/20 |
| 5,132,700 A | 7/1992 | Tochihara et al. | ............. | 346/1.1 |
| 5,213,613 A | 5/1993 | Nagashima et al. | ....... | 106/20 R |
| 5,221,497 A | 6/1993 | Watanabe et al. | ........ | 252/313.2 |
| 5,258,066 A | 11/1993 | Kobayashi et al. | ........ | 106/22 R |
| 5,296,022 A | 3/1994 | Kobayashi et al. | ........ | 106/20 D |
| 5,451,251 A | 9/1995 | Mafune et al. | ............ | 106/22 H |
| 5,466,282 A | 11/1995 | Eida et al. | ................. | 106/22 K |
| 5,571,313 A | 11/1996 | Mafune et al. | ............ | 106/22 H |
| 5,936,649 A | 8/1999 | Ikeda et al. | ................... | 347/87 |
| 6,412,936 B1 | 7/2002 | Mafune et al. | ............. | 347/100 |
| 6,460,988 B1 | 10/2002 | Mafune et al. | ............. | 347/100 |
| 6,702,882 B2 | 3/2004 | Yakushigawa et al. | ... | 106/31.27 |
| 6,706,100 B2 | 3/2004 | Mafune et al. | ........... | 106/31.27 |
| 6,706,104 B2 | 3/2004 | Takuhara et al. | ........... | 106/31.6 |
| 6,843,839 B2 | 1/2005 | Kanke et al. | ............. | 106/31.47 |
| 6,866,380 B2 | 3/2005 | Yakushigawa et al. | ...... | 347/100 |
| 7,033,423 B2 | 4/2006 | Rolly | ...................... | 106/31.13 |
| 7,144,452 B2 | 12/2006 | Takayama et al. | ......... | 106/31.52 |
| 7,160,372 B2 | 1/2007 | Yoshizawa et al. | ....... | 106/31.47 |
| 7,195,664 B2 | 3/2007 | Mafune et al. | ........... | 106/31.27 |
| 7,198,664 B2 | 4/2007 | Mafune et al. | ........... | 106/31.28 |
| 7,198,665 B2 | 4/2007 | Nakamura et al. | ....... | 106/31.52 |
| 7,226,498 B2 | 6/2007 | Yamashita et al | .......... | 106/31.5 |
| 7,241,332 B2 | 7/2007 | Yoshizawa et al. | ........ | 106/31.47 |
| 7,247,194 B2 | 7/2007 | Okamura et al. | ......... | 106/31.47 |
| 7,247,196 B2 | 7/2007 | Sato et al. | ................. | 106/31.52 |
| 7,250,079 B2 | 7/2007 | Chino et al. | ............. | 106/31.52 |
| 7,270,701 B2 | 9/2007 | Jinnou et al. | ............. | 106/31.47 |
| 7,285,159 B2 | 10/2007 | Aikawa et al. | ............ | 106/31.47 |
| 7,294,184 B2 | 11/2007 | Fujimoto et al. | ......... | 106/31.47 |
| 7,297,197 B2 | 11/2007 | Jinnou et al. | ............. | 106/31.47 |
| 7,374,606 B2 | 5/2008 | Sato et al. | ................ | 106/31.27 |
| 7,465,346 B2 * | 12/2008 | Fukumoto et al. | ........ | 106/31.48 |
| 2006/0103705 A1 | 5/2006 | Yoshizawa et al. | .......... | 347/100 |
| 2006/0144288 A1 | 7/2006 | Ohno et al. | ............. | 106/31.27 |
| 2006/0162616 A1 | 7/2006 | Chino et al. | ............. | 106/31.51 |
| 2007/0109376 A1 * | 5/2007 | Tojo et al. | ................ | 106/31.48 |
| 2007/0257975 A1 * | 11/2007 | Yoneda et al. | ............ | 106/31.48 |
| 2008/0018722 A1 | 1/2008 | Mafune et al. | ............. | 347/100 |
| 2009/0047430 A1 * | 2/2009 | Mori et al. | ................ | 106/31.48 |
| 2009/0062545 A1 * | 3/2009 | Matsui et al. | ............. | 106/31.48 |

FOREIGN PATENT DOCUMENTS

| | | |
|---|---|---|
| JP | 57-44605 | 3/1982 |
| JP | 8-26263 | 1/1996 |
| JP | 2803134 | 7/1998 |
| JP | 2881847 | 2/1999 |

—◇— INK WHICH PROVIDES IMAGE HAVING GRADATION PROPERTY WITH COLOR TONE OUT OF NEUTRAL
—□— INK WHICH PROVIDES IMAGE HAVING GRADATION PROPERTY WITH COLOR TONE OUT OF NEUTRAL
—✕— INK WHICH PROVIDES IMAGE HAVING GRADATION PROPERTY WITH COLOR TONE FAVORABLE FOR BLACK INK
—△— INK WHICH PROVIDES IMAGE HAVING GRADATION PROPERTY WITH COLOR TONE MORE FAVORABLE FOR BLACK INK

| | | |
|---|---|---|
| JP | 2004-83492 | 3/2004 |
| JP | 2005-68416 | 3/2005 |
| JP | 2005-139427 | 6/2005 |
| JP | 2005-146244 | 6/2005 |
| JP | 2006-28256 | 2/2006 |
| JP | 2006-282795 | 10/2006 |
| JP | 2006-526062 | 11/2006 |
| WO | WO 2006/001274 | 1/2006 |

* cited by examiner

*Primary Examiner*—Helene Klemanski

(74) *Attorney, Agent, or Firm*—Fitzpatrick, Cella, Harper & Scinto

(57) ABSTRACT

Provided is a black ink which provides an image with excellent color tone, little color tone change after a light fastness test and excellent balance of color tone change and light fastness. The black ink further provides an image with a gradation property having a color tone close to a neutral color tone even before and after a light fastness test. The ink contains at least a compound represented by the general formula (I) as a first coloring material, a compound represented by the general formula (II) as a second coloring material and a compound represented by the general formula (III) as a third coloring material

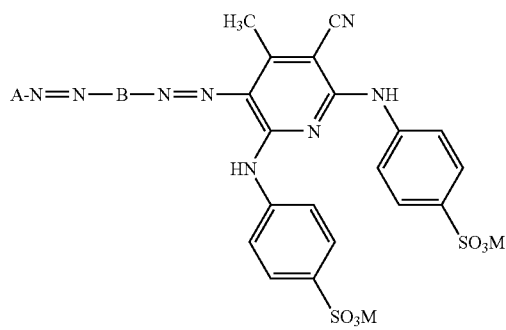

General formula (I)

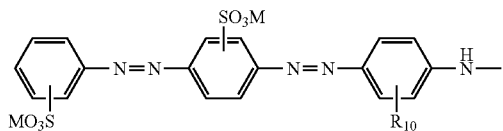

General formula (II)

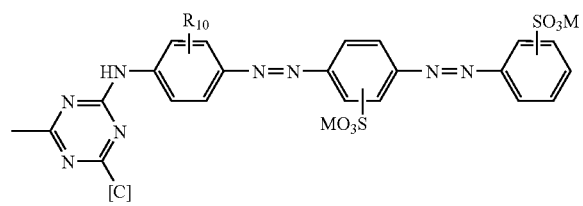

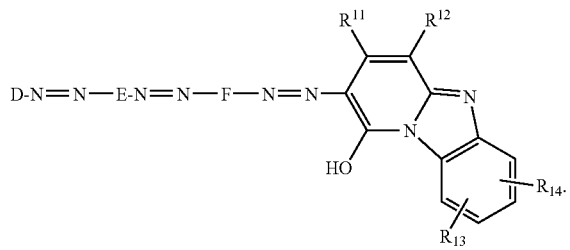

General formula (III)

12 Claims, 8 Drawing Sheets

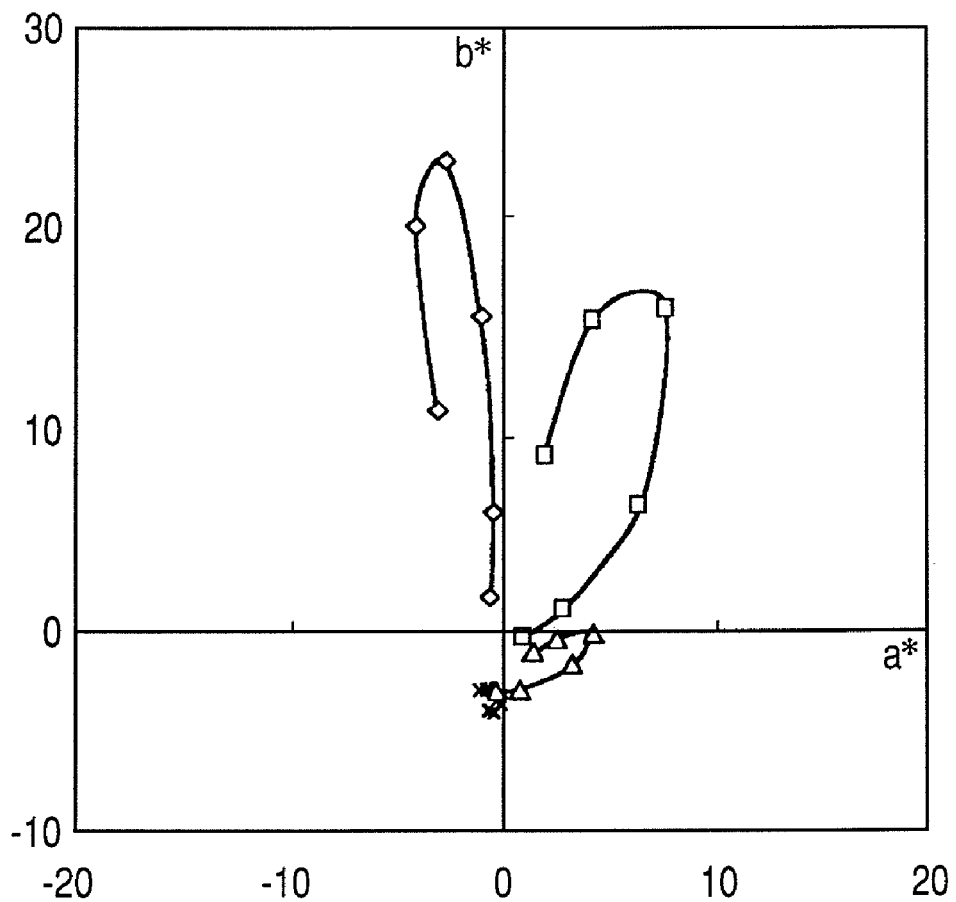

FIG. 7

—◇— INK WHICH PROVIDES IMAGE HAVING GRADATION PROPERTY WITH COLOR TONE OUT OF NEUTRAL
—□— INK WHICH PROVIDES IMAGE HAVING GRADATION PROPERTY WITH COLOR TONE OUT OF NEUTRAL
—✕— INK WHICH PROVIDES IMAGE HAVING GRADATION PROPERTY WITH COLOR TONE FAVORABLE FOR BLACK INK
—△— INK WHICH PROVIDES IMAGE HAVING GRADATION PROPERTY WITH COLOR TONE MORE FAVORABLE FOR BLACK INK

INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an ink, an ink jet recording method, an ink cartridge, a recording unit and an ink jet recording apparatus 2. Description of the Related Art An ink jet recording method is a recording method that minute droplets of an ink are applied to a recording medium such as plain paper or glossy medium, thereby forming an image, and is rapidly spread because of lowered price of an apparatus itself and improvement of recording speed. With rapid spreading of digital cameras in addition to the progress of the formation of high-quality images by the ink jet recording method, the ink jet recording method becomes general as an output method of images comparable with a silver halide photograph.

One of the problems involved in the ink jet recording method is poor image storage stability of the resulting recorded article. In general, a recorded article obtained by the ink jet recording method involves a problem that the image storage stability thereof is poor compared with a silver halide photograph. More specifically, when the recorded article is exposed to light, humidity or an environmental gas present in the air for a long period of time, there arises such a problem that a coloring material on the recorded article is deteriorated, and so change of color tone of the image or color fading is easy to occur. The light fastness of an image formed with a black ink often attends on change of color tone caused by deterioration of the coloring material, so the deterioration is particularly markedly recognized. Thus this drawback has bee recognized as a problem to be solved, and many proposals have been made therefor.

For example, proposals that additives such as an ultraviolet absorbent and an antioxidant are caused to be contained in an ink, thereby inhibiting deterioration of a coloring material have been made. However, in order to fully achieve an effect by using these additives, it is necessary to increase the content of the additives, and so such proposals have a possibility that the reliability of the resulting ink may be influenced to cause ejection failure or sticking of the ink.

In order to solve such a problem, various proposals have been made as to the idea that the light fastness of an image is improved by using an ink containing a coloring material having a structure excellent in light fastness. For example, there has been a proposal that the fastness properties of the resulting image, such as light fastness and ozone fastness, the storage stability of the resulting ink and the color tone of the image are made excellent by an ink containing a dye for which the number of aromatic conjugated π electrons not directly bonded to an azo group is regulated (see Japanese Patent Application Laid-Open No. 2005-139427). A proposal has been made as to a yellow to red dye excellent in color tone of an image, useful as a dye for toning of a black ink and excellent in light fastness and ozone fastness, and inks containing such a dye (see International Publication No. WO2006/001274 Pamphlet).

On the other hand, from the viewpoint of image quality, an image formed with a black ink is required to have a nearly neutral color tone in addition to a high optical density. Incidentally, the term "neutral color tone" as used in the present invention specifically means such a color tone that when a color tone of an image is evaluated by measuring a* and b* in the L*a*b* color space prescribed by CIE (International Commission on Illumination), these values fall within respective specific ranges. This may be described in detail in Examples, which will be described later. In order to achieve a nearly neutral color tone, such an image is required to exhibit nearly flat absorption in a visible region. On the other hand, it is difficult for an azo dye generally used as a water-soluble dye to achieve a high optical density and a nearly neutral color tone with one coloring material. Therefore, a technique of achieving the above requirement by combining a plurality of different dyes has been proposed.

For example, a proposal has been made as to the idea that an ink containing both a specific black dye with a bluish black tone, such as C.I. Food Black 1, and a magenta and/or yellow dye is used, thereby providing an image excellent in light fastness (see Japanese Patent Publication No. H08-026263). There has also been a proposal as to a black ink containing both a tetrakis-azo dye and a condensation compound of 4,4'-dinitrostilbene-2,2'-disulfonic acid with aminobenzene. It is said that an image excellent in light fastness and ozone fastness can be formed by using the black ink having such a composition (see Japanese Patent Application Laid-Open No. 2005-068416). Further, a black ink containing both a specific azo dye having a heterocyclic ring and an azo dye having a specific structure has been proposed (see Japanese Patent Application Laid-Open No. 2005-146244). Still further, a black ink containing both a dye having a specific structure, whose maximum absorption wavelength in absorption spectrum exists in a long wavelength region and a dye whose maximum absorption wavelength exists in a short wavelength region (see Japanese Patent Application Laid-Open No. 2006-282795). It is said that these inks provide images excellent in color tone, light fastness and ozone fastness.

The following proposal has been made as to the idea that a black ink is used to provide a gray image. Namely, there has been a proposal as to an ink for which the maximum absorption wavelength in an absorption spectrum of a coloring material is regulated and which has both a dye whose maximum absorption wavelength exists in a long wavelength region and a dye whose maximum absorption wavelength exists in a short wavelength region (see Japanese Patent Application Laid-Open No. 2006-028256). It is disclosed that the ink containing these dyes is used, thereby keeping a color tone of the gray image at a achromatic color, and that the color difference after a light fastness test is regulated, thereby providing a black ink excellent in light fastness.

The following proposal has been made for the purpose of inhibiting deterioration caused by humidity on a gray or black image formed by using toned inks respectively containing a black, yellow, magenta and cyan dyes. Namely, a proposal has been made as to the idea that inks respectively containing a black dye and a proper color dye are used. It is said that an image excellent in light fastness and humidity fastness is provided by using such an ink (see Japanese Unexamined Patent Publication No. 2006-526062). Specifically, an ink set of 3 inks of light gray, medium gray and dark gray inks each having properties of hue range, chroma range and lightness (L*) described below is used to form an image. The light gray ink has a hue range of from 250° to 310°, a chroma range less than 6 and a lightness (L*) from 54 to 72. The medium gray ink has a hue range of from 250° to 310°, a chroma range less than 6 and a lightness (L*) from 30 to 47. The dark gray ink has a hue range of from 150° to 270°, a chroma range less than 6 and a lightness (L*) from 10 to 18. It is described that when two or three inks of the light gray, medium gray and dark gray inks are used together to conduct recording, the gray color becomes a hue range of from 250° to 310° and a chroma range of from 2 to 6.

SUMMARY OF THE INVENTION

The present inventors have been carried out an investigation from the viewpoints of color tone and light fastness in images formed by using black inks, and paid attention to the fact that a compound represented by the following general formula (I) is excellent in light fastness in an image formed at a recording duty of 100%.

Many known black dyes have such a tendency that the color tone of an image is changed to a yellowish black tone after a light fastness test by irradiating the image with light. In other words, an image formed by using an ink containing a publicly known dye has such a tendency that the degree of lowering of an optical density in a magenta wavelength region or especially in a cyan wavelength region is great compared with an optical density in a yellow wavelength region. Incidentally, the optical density in each wavelength region can be determined by measuring optical densities (spectral sensitivity characteristic; using ISO Status A) of respective components of yellow, magenta and cyan by means of a spectrophotometer.

On the other hand, it has been found that in an image formed by using an ink containing a compound represented by the general formula (I), the degrees of lowering of optical densities in the respective wavelength regions of yellow, magenta and cyan are almost equivalent to one another. That is, the compound represented by the general formula (I) was found to have a characteristic that the color tone hardly caused change after the lightfastness test. It has also been found that the color tone of the image formed by using the ink containing the compound represented by the general formula (I) is greenish black tone, and the compound represented by the general formula (I) had the possibility to be used in a black ink.

Thus, the present inventors have carried out an investigation as to the idea that the compound represented by the general formula (I) and a compound represented by the following general formula (II) having a yellow to red color tone and the property of being excellent in light fastness are used in combination to adjust the color tone of the ink containing the compound represented by the general formula (I). The compound represented by the general formula (II) will be described subsequently. As a result, the initial color tone of an image formed at a recording duty of 100% with an ink containing these compounds has been close to a neutral color tone. The residual ratio of an optical density (spectral sensitivity characteristic; using ISO Visual) of black after the light fastness test of the image has been at a level within an expected range.

However, it has been found that the ink making combined use of the compound represented by the general formula (I) and the compound represented by the general formula (II) involves the following new problem. Specifically, an image formed with such an ink has been great in change of color tone after the light fastness test. The degree of lowering of optical density of the image in a magenta or cyan wavelength region has been great compared with a yellow wavelength region though the ink containing the compound represented by the general formula (I) having the property of being hard to cause change of color tone to the light fastness test has been used. In other words, it has been found that in the ink making combined use of the compound represented by the general formula (I) and the compound represented by the general formula (II), a part of the characteristics of the compound represented by the general formula (I) is lost in the recording medium, and the excellent light fastness inherent in such a compound is not sufficiently developed.

Accordingly, it is a first object of the present invention to solve such a problem as described above in the ink containing the compound represented by the general formula (I) and the compound represented by the general formula (II), and further to provide an ink which can solve the above problem and provide an image having an initial color tone close to a neutral color tone and an excellent balance of change of color tone after the light fastness test.

During investigation as to a method for solving this first problem, the present inventors have found that a distribution position (permeation depth) of a coloring material in a thickness-wise direction of an ink-receiving layer of a recording medium when the ink is applied to the recording medium may vary in some cases due to a difference in the structure of the coloring material. In other words, it has been found that an image formed with an ink containing a plurality of coloring materials involves the following problem. The degrees of deterioration of the coloring materials caused by light vary due to a difference in presence position (permeation depth) of the respective coloring materials in the thickness-wise direction of the ink-receiving layer of the recording medium, i.e., the color tones after the light fastness test may vary in some cases to impair a balance of changes in color tone.

Accordingly, it is a second object of the present invention to provide such a technique that when a plurality of coloring materials are used, conditions for selection of the coloring materials are optimized, thereby controlling distribution positions (permeation depths) of the coloring materials in the thickness-wise direction of the ink-receiving layer of the recording medium to find a correlation useful for light fastness, and further to provide an ink making use of this technique.

In a course of the investigation about the above mentioned problem, it has further been found that when an image having a gradation property is formed with the ink containing the compound represented by the general formula (I) and the compound represented by the general formula (II), the color tone of the resultant image may depart from the neutral color tone in some cases. When an image (gray image) having a gradation property is formed with a black ink, there is a tendency for an image having a recording duty of about 40% called the so-called half tone to markedly change its color tone (see FIG. 7). FIG. 7 is a chromaticity diagram on an a*b* plane in images formed with a black ink at recording duties of 100%, 80%, 60%, 40%, 20% and 10%, respectively. Incidentally, the term "image having a gradation property" as used in the present invention means an image formed by changing the recording duty to at least 2 duties from a high-recording duty image to a low-recording duty image upon forming the image.

Accordingly, it is a third object of the present invention to provide an ink with less change of color tone and optimized balance of gradation property even when an image (gray image) having a gradation property is formed.

It is an object of the present invention to solve at least one of the above problems. Specifically, the object is to provide a black ink which provides an image having an initial color tone close to a neutral color tone, little in change of color tone after the light fastness test and excellent in a balance of change of color tone and light fastness. Further, the object is to provide a black ink which provides an image with a gradation property having a color tone close to a neutral color tone even before and after the light fastness test. Another object of the present invention is to provide a black ink with optimized balance of gradation property even when an image (gray image) having a gradation property is formed. Furthermore, still another object of the present invention is to provide an ink jet recording method, an ink cartridge, a recording unit and an ink jet recording apparatus using the above-described ink.

The above objects can be achieved by the present invention described below. More specifically, an ink according to the present invention is an ink comprising a first coloring material, a second coloring material and a third coloring material, wherein the first coloring material is a compound represented by the following general formula (I), the second coloring material is a compound represented by the following general formula (II), and the third coloring material is a compound represented by the following general formula (III):

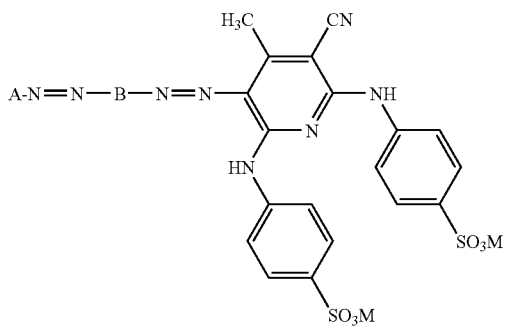

General Formula (I)

wherein A is an aromatic or heterocyclic group which may be substituted, B is any group represented by the following general formulae (1) to (5), and M's are, independently of each other, a hydrogen atom, alkali metal, ammonium or organic ammonium,

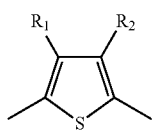

General formula (1)

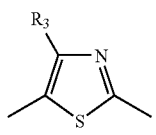

General formula (2)

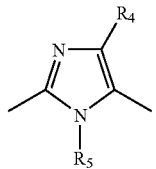

General formula (3)

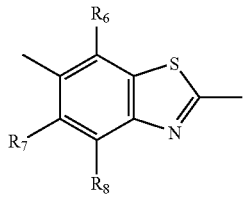

General formula (4)

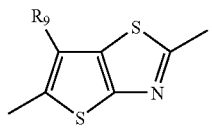

General formula (5)

wherein $R_1$ to $R_9$ are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group containing an anilino group or heterocyclic amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group with the proviso that each group may be further substituted;

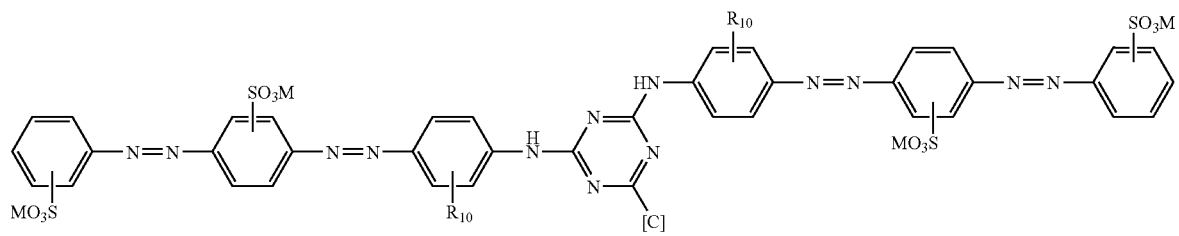

General formula (II)

wherein groups $R_{10}$ are, independently of each other, a hydrogen atom, a hydroxyl group, a carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5)alkylamino group, a bis[carboxy-(C1-C5)alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group, C is an aliphatic amine residue having a carboxyl or sulfonic group, and M's are, independently of one another, a hydrogen atom, alkali metal, ammonium or organic ammonium; and General formula (III)

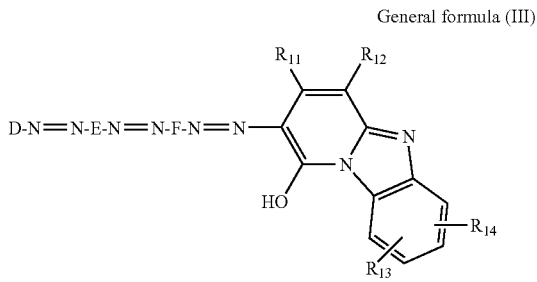

wherein D is a phenyl group having a substituent selected from the group consisting of a carboxyl group, a sulfonic group, a chlorine atom, a cyano group, a nitro group, a sulfamoyl group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group, E and F are, independently of each other, a paraphenylene group having a substituent selected from the group consisting of a carboxyl group, a sulfonic group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group, $R_{11}$ is an alkyl group having 1 to 4 carbon atoms, which may be substituted by a carboxyl group, a phenyl group, which may be substituted by a sulfonic group, or a carboxyl group, $R_{12}$ is a cyano group, carbamoyl group or carboxyl group, and $R_{13}$ and $R_{14}$ are, independently of each other, a hydrogen atom, methyl group, chlorine atom or sulfonic group.

An ink jet recording method according to another embodiment of the present invention is an ink jet recording method comprising a step of ejecting an ink by an ink jet system to conduct recording on a recording medium, wherein the ink is the ink of the above-described constitution.

An ink cartridge according to a further embodiment of the present invention is an ink cartridge comprising an ink storage portion storing an ink, wherein the ink is the ink of the above-described constitution.

A recording unit according to a still further embodiment of the present invention is a recording unit comprising an ink storage portion storing an ink and a recording head for ejecting the ink, wherein the ink is the ink of the above-described constitution.

An ink jet recording apparatus according to a yet still further embodiment of the present invention is an ink jet recording apparatus comprising an ink storage portion storing an ink and a recording head for ejecting the ink, wherein the ink is the ink of the above-described constitution.

According to the present invention, there can be provided a black ink, which can provide an image having an initial color tone close to a neutral color tone and excellent in a balance of change of color tone after the light fastness test. According to another embodiment of the present invention, there can be provided a black ink, which provides an image excellent in initial color tone, little in change of color tone after the light fastness test and also excellent in light fastness. According to still another embodiment of the present invention there can be provided a black ink, which can provide an image optimized balance of gradation property even when an image (gray image) having a gradation property is formed. According to a further embodiment of the present invention, there can be provided an ink jet recording method, an ink cartridge, a recording unit and an ink jet recording apparatus using the above-described ink.

Further features of the present invention will become apparent from the following description of exemplary embodiments with reference to the attached drawings.

BRIEF DESCRIPTION OF THE DRAWINGS

FIG. 7 is a chromaticity diagram on an a*b* plane in images formed with a black ink at recording duties of 100%, 80%, 60%, 40%, 20% and 10%, respectively FIGS. 8A, 8B, 8C, 8D and 8E typically illustrate dispersion positions of coloring materials in a recording medium when inks containing the respective coloring materials have been separately applied to the recording medium.

DESCRIPTION OF THE EMBODIMENTS

Figure 1:
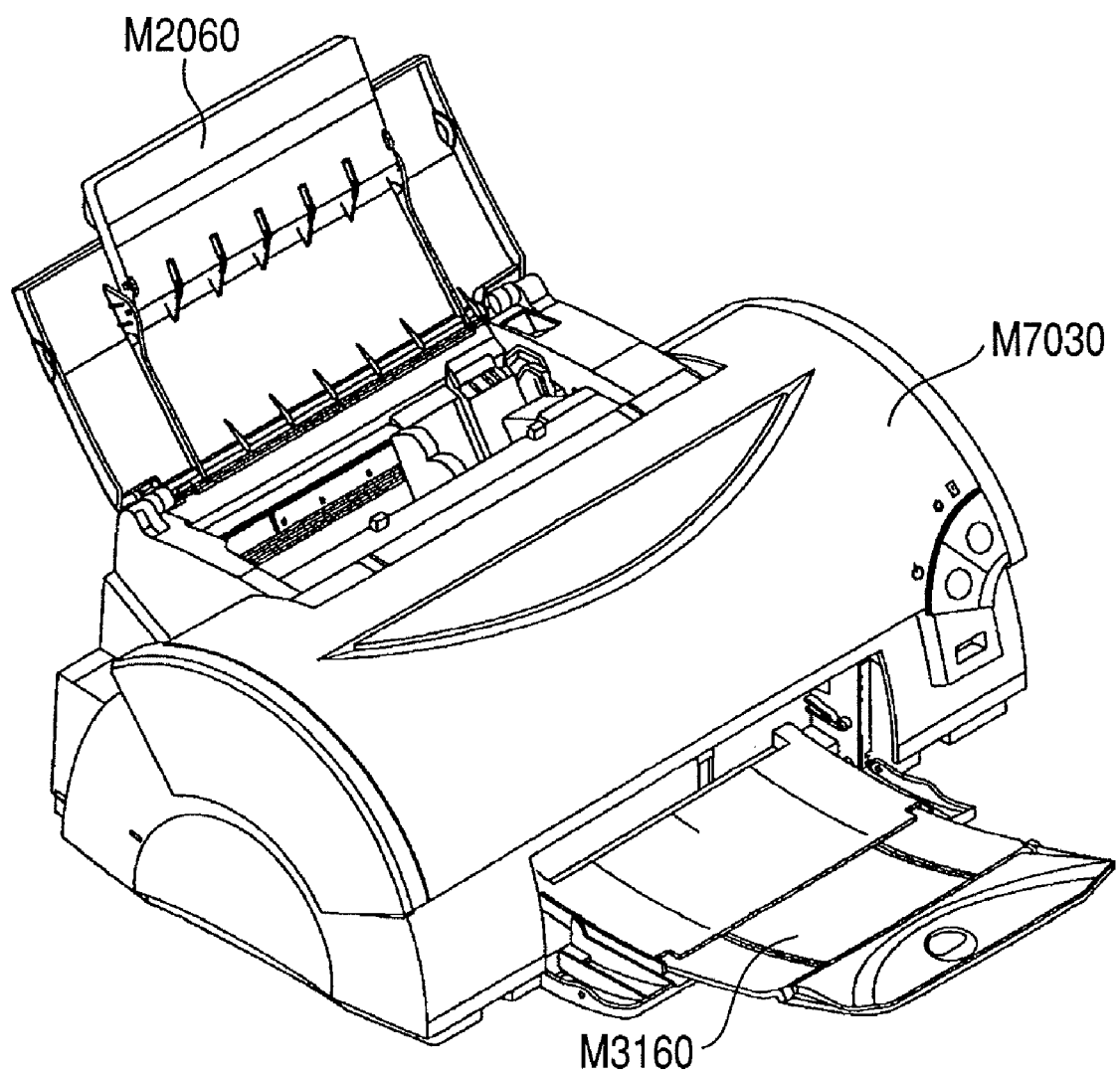
FIG. 1 is a perspective view of an ink jet recording apparatus.

The present invention will hereinafter be described in detail by exemplary embodiments. Incidentally, when a compound is a salt, the salt exists in an ink being dissociated into ions. In the present invention, however, the ink is represented with the expression "containing the salt" for the sake of convenience. In the following description, the compound represented by the general formula (I), the compound represented by the general formula (II) and the compound represented by the general formula (III) may be described as "compound of the general formula (I)", "compound of the general formula (II)" and "compound of the general formula (III)", respectively.

The present inventors have paid attention to a compound of the general formula (III), which will be described subsequently, in the course of an investigation as to the color tone and light fastness of an image obtained by using an ink containing a compound of the general formula (I) and a compound of the general formula (II), which will be described subsequently. According to the investigation of the present inventors, an image obtained by using an ink containing only the compound of the general formula (III) as a coloring material has a color tone with a bluish black tone, and the degrees of lowering of optical densities in respective wavelength regions of the image obtained by the ink after the light fastness test become greater in the order of a yellow wavelength region, a magenta wavelength region and a cyan wavelength region. However, it has been found that the residual ratios of optical density are all high.

Thus, the present inventors have carried out a detailed investigation as to an ink containing the compound of the general formula (III) as a coloring material in addition to the compound of the general formula (I) and the compound of the general formula (II). As a result, the color tone of an image (initial image) formed with the ink containing these 3 coloring materials at a recording duty of 100% has become close to the neutral color tone. With respect to light fastness, it has also been found that the degrees of lowering of optical densities in the respective wavelength regions of yellow, magenta and cyan of the image are almost equivalent to one another, and so the image is little in change of color tone even after the light fastness test and retains the color tone of the image close to neutral. The present invention has been led to completion based on such finding.

The present inventors have carried out a further investigation as to the ratio among the contents of the compound of the general formula (I), the compound of the general formula (II) and the compound of the general formula (III). As a result, it has been found that when the mass ratio among the contents of these 3 coloring materials is controlled within a certain range, not only an image at the recording duty of 100%, but also an image having a gradation property has a nearly neutral color tone. With respect to the light fastness, it has also been found that an image obtained by an image with the mass ratio controlled within a certain range is further little in change of color tone of the image after the light fastness test and has a nearly neutral color tone.

The ink according to the present invention contains at least the compound of the general formula (I), the compound of the general formula (II) and the compound of the general formula (III). The present inventors considers the reason why the effect that the change of color tone after the light fastness test is inhibited and the balance of the change of color tone becomes good is brought about in the image formed with the ink containing these 3 compounds (coloring materials) in combination to be as follows.

When such a recording medium that a coloring material is caused to be adsorbed on fine particles forming a porous structure of an ink-receiving layer is used as the recording medium, the distribution position (permeation depth) of the coloring material in a thickness-wise direction of the ink-receiving layer of the recording medium varies with the aggregation property and adsorbability on the recording medium of the coloring material. In this case, it is considered that the degree of deterioration of the coloring material by the light fastness test varies with the permeation depth of the coloring material into the recording medium. First, it is considered that when the coloring material exists at a deeper position (more interior position) in the thickness-wise direction of the recording medium, the intensity of light is weakened at this position by scattering or absorption of the light in the recording medium, so that the coloring material is hard to be affected by the light. On the other hand, it is inferred that when the coloring material exists at a shallower position (in more vicinity to the surface) in the thickness-wise direction of the recording medium, the coloring material is easy to be affected by the light and to be deteriorated in the light fastness test.

Figure 8A:
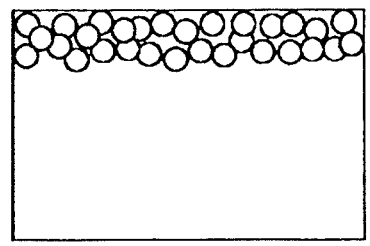
Figure 8B:
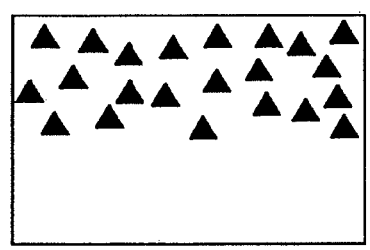
Figure 8C:
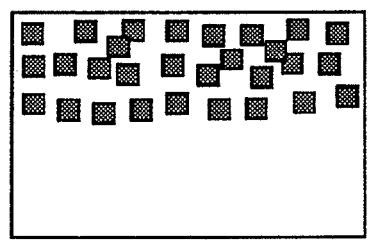

Based on this inference, the present inventors have made verification using inks of Examples and Comparative Examples, which will be described subsequently. As a result, the following fact has been found. First, an investigation has been made by using inks containing each of the compounds (coloring materials) making up the ink according to the present invention singly. As a result, it has been found that the distribution position of the coloring material in the thickness-wise direction of a recorded article, i.e., a recording medium varies depending on the respective coloring materials. The distribution positions of the respective coloring materials in the recording medium in the case where the inks respectively containing each of the coloring materials are separately applied to the recording medium will hereinafter be described with reference to FIGS. 8A to 8C that are typical views. The overall distribution position of the coloring material in the case where the ink containing the compound of the general formula (I) alone was used was shallowest (more distributed in the vicinity of the surface of the recording medium) (FIG. 8A). The overall distribution position of the coloring material in the case where the ink containing the compound of the general formula (III) alone was used was deeper than that of the ink containing the compound of the general formula (I) alone (FIG. 8C). The overall distribution position of the coloring material in the case where the ink containing the compound of the general formula (II) alone was used was the deepest (more distributed at interior positions of the recording medium) of the recording medium) among them (FIG. 8B).

Figure 8D:
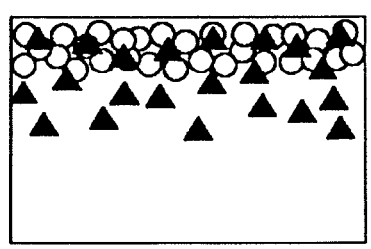

From this result, it has been found that the compound of the general formula (I), which has the property of being excellent in light fastness and hard to cause change of color tone, exists at the distribution position easiest to be subjected to deterioration of the coloring material by light. From this fact, the reason why the change of color tone after the light fastness test of the image (FIG. 8D) formed with the ink making combined use of the compound represented by the general formula (I) and the compound represented by the general formula (II) became great is considered to be as follows. The compound of the general formula (I) is hard to permeate in the thickness-wise direction (interior) of the recording medium because of its high aggregation property and exists more in the vicinity to the surface. On the other hand, the compound of the general formula (II) is easy to permeate in the thickness-wise direction of the recording medium and exists at interior positions, so that the compound of the general formula (I) is considered to be more easily subjected to deterioration by light than the compound of the general formula (II) and thus the character of keeping the balance of the color tone inherent in the compound of the general formula (I).

Figure 8E:
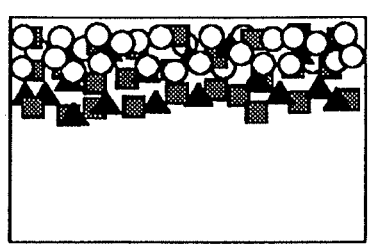

On the other hand, as illustrated in FIG. 8E, in an image formed with the ink of the present invention containing the three compounds (coloring materials), the degrees of lowering of optical densities in the respective wavelength regions of yellow, magenta and cyan after the light fastness test are almost equivalent to one another and the change of color tone of the image is inhibited. The reason why the change of color tone of the image can be inhibited by the ink containing the three compounds is considered to be as follows. The compound of the general formula (I), the compound of the general formula (II) and the compound of the general formula (III)

contained in the ink exist in a relatively uniform state in the recording medium. Therefore, the ink making combined use of the three coloring materials can more inhibit the deterioration of the compound of the general formula (I) by light than the ink making combined use of the compound of the general formula (I) and the compound of the general formula (II), so that the respective coloring materials are faded with well balanced.

The present inventors have prepared an ink containing the two compounds represented by the general formulae (I) and (II) and an ink containing the three compounds represented by the general formulae (I), (II) and (III) and formed images with the respective inks to carry out the investigation as to the above phenomenon. Specifically, the distribution positions (permeation depths) of the coloring materials in the thickness-wise direction of an ink-receiving layer of a recording medium in these images have been compared. As a result, when the latter ink containing the three compounds was applied to the recording medium, the distribution positions of three coloring materials have tended to be almost equivalent or shallow (as illustrated in FIG. 8E) compared with the distribution positions of two coloring materials contained in the former ink. This is considered to be attributable to the fact that the three compounds of the latter ink, in the recording medium, interact to one another, thereby inhibiting aggregation of the compound of the general formula (I) in the recording medium and also inhibiting permeation of the compound of the general formula (II) into the recording medium.

The present inventors infer the reason why such a phenomenon occurs as being caused by the following fact. When the respective structures of the compound of the general formula (I), the compound of the general formula (II) and the compound of the general formula (III) used in the present invention are compared, there are the following features. First, the compound of the general formula (I) is a disazo compound having at least two heterocyclic rings. The compound of the general formula (II) is a tetrakisazo compound having six benzene rings and one heterocyclic ring. On the other hand, the compound of the general formula (III) has three benzene rings and one heterocyclic ring. These compounds are typically represented as follows (J, J' and K being a benzene ring, an aromatic ring and a heterocyclic ring, respectively).

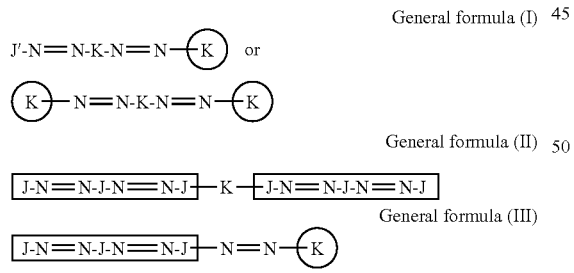

General formula (I)

General formula (II)

General formula (III)

When the structures of these compounds are compared, the compound of the general formula (III) has both a portion similar to the compound of the general formula (I) and a portion similar to the compound of the general formula (II). Therefore, it is considered that when these compounds coexist in a recording medium, the compound of the general formula (III) interacts on both compounds of the general formulae (I) and (II). It is inferred that the aggregation of the compound of the general formula (I) in the recording medium and the permeation of the compound of the general formula (II) into the recording medium are inhibited by this action. It is also considered that since the color tone of the ink can be adjusted to a more neutral color tone by causing the compound of the general formula (II) to be contained in the ink, an image having a neutral color tone can be obtained even in an image having a gradation property.

As described above, a feature of the ink according to the present invention resides in that the three coloring materials of the compound of the general formula (I), the compound of the general formula (II) and the compound of the general formula (III) are contained. In the present invention, the ink is particularly favorably designed in such a manner that when an image formed with the ink is subjected to the light fastness test, the residual ratio of optical density in each wavelength region, which is determined from optical densities of an image before the light fastness test and an image after the light fastness test, satisfies the following relationship. Incidentally, conditions upon the formation of the image are set in such a manner that the amount of the ink applied to a recording medium is 11 g/m$^2$ (corresponding to a recording duty of almost 100%). The image obtained in such a manner is subjected to the light fastness test under the condition that the image is exposed to light from a xenon lamp for 100 hours at 100 klx in irradiation intensity, 24° C. in temperature and 60% in relative humidity. With respect to the images before and after the light fastness test, optical densities of a yellow component, a magenta component and a cyan component, which are prescribed by the spectral sensitivity characteristic (ISO Status A) in a yellow wavelength region, a magenta wavelength region and a cyan wavelength region are respectively determined. The residual ratio of optical density represented by the following equation is particularly favorably such that a difference between a maximum value and a minimum value of the residual ratios of optical density in the yellow component, magenta component and cyan component is 0 or more and 5 or less. An ink satisfying such conditions is provided, whereby an image having a further neutral color tone even after the light fastness test can be obtained. In other words, an image excellent in light fastness can be obtained. Needless to say, the present invention is not limited to the ink satisfying the above conditions.

Residual ratio of optical density [%]=(Optical density after test)/(Optical density before test)×100

In the present invention, the ink according to the present invention particularly favorably satisfies the following conditions. Specifically, it is particularly favorable that the kinds of solubilizing groups in the compound of the general formula (I), which is a first coloring material, the compound of the general formula (II), which is a second coloring material, and in the compound of the general formula (III), which is a third coloring material, are the same, and the numbers of the solubilizing groups in their molecules are the same. The solubilizing group is a group capable of being dissociated in the ink, and examples thereof include a sulfonic group and a carboxyl group. It is considered that an ink satisfying the above conditions is provided, whereby the structures of the three compounds used as coloring materials become more similar, and the effect achieved by the fact that the compound of the general formula (III) interacts on both compounds of the general formulae (I) and (II) is particularly markedly brought about. It is also considered that since the color tone of the ink can be adjusted to a more neutral color tone by constituting the ink in the above-described manner, an image having a further neutral color tone can be obtained even in an image having a gradation property.

\<Ink\>

The ink according to the present invention is an ink containing at least the compound of the general formula (I) as a first coloring material and the compound of the general formula (II) as a second coloring material, wherein the ink further contains the compound of the general formula (III) as a third coloring material. The components making up the ink according to the present invention and physical properties of the ink will hereinafter be described.

(Coloring Materials)

[First Coloring Material; Compound Represented by the General Formula (I)]

The ink according to the present invention requires containing the compound of the following general formula (I) as the first coloring material.

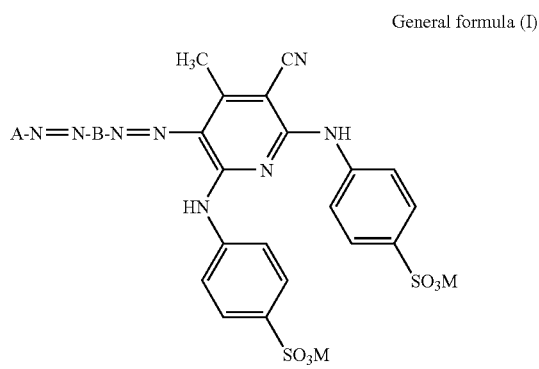

General formula (I)

wherein A is an aromatic or heterocyclic group which may be substituted, B is any group represented by the following general formulae (1) to (5), and M's are, independently of each other, a hydrogen atom, alkali metal, ammonium or organic ammonium.

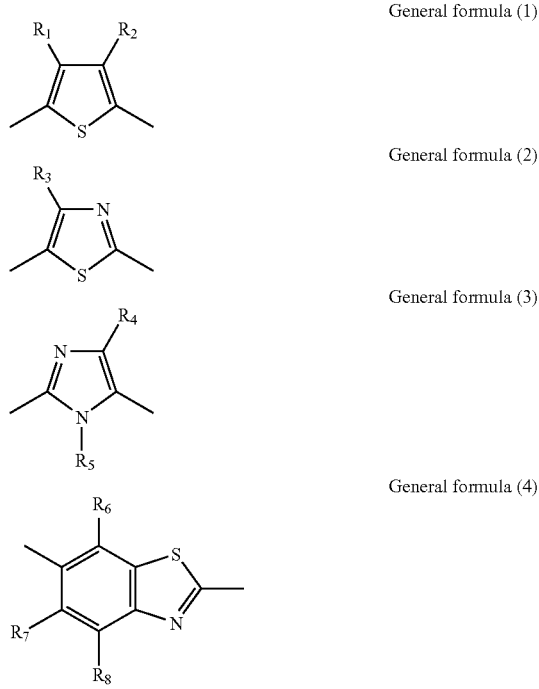

General formula (1)

General formula (2)

General formula (3)

General formula (4)

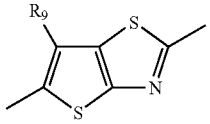

General formula (5)

wherein $R_1$ to $R_9$ are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group containing an anilino group or heterocyclic amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group with the proviso that each group may be further substituted.

A in the general formula (I) is an aromatic or heterocyclic group which may be substituted. Specific examples thereof include substituents such as benzene ring, naphthalene ring, pyridine ring, imidazole ring, pyrazole ring, thiazole ring, isothiazole ring, thiadiazole ring, benzothiazole ring and benzoisothiazole ring. Among these substituents, benzene ring, naphthalene ring, pyridine ring, pyrazole ring, imidazole ring, isothiazole ring and benzothiazole ring are favorable, and benzene ring and naphthalene ring are more favorable.

B in the general formula (I) is any group represented by the above-described general formulae (1) to (5). $R_1$ to $R_9$ in the general formulae (1) to (5) are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group containing an anilino group or heterocyclic amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group with the proviso that each group may be further substituted.

Examples of the halogen atom include chlorine, bromine and iodine atoms. Among these halogen atoms, the chlorine and bromine atoms are favorable, and the chlorine atom is more favorable.

Examples of the aliphatic group include alkyl, substituted alkyl, alkenyl, substituted alkenyl, alkynyl, substituted alkynyl, aralkyl and substituted aralkyl groups. These aliphatic groups may have a branch or may form a cycle. The aliphatic group favorably has 1 to 20 carbon atoms, more favorably 1 to 16 carbon atoms. The aryl portion of the aralkyl or substituted aralkyl group is favorably phenyl or naphthyl, more favorably phenyl. Specific examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

Examples of the aromatic group include monovalent or divalent aryl groups and substituted aryl groups. The monovalent aromatic groups include aryl groups and substituted aryl groups. The aryl group is favorably phenyl or naphthyl, more favorably phenyl. The monovalent aromatic group favorably has 6 to 20 carbon atoms, more favorably 6 to 16 carbon atoms. Specific examples of the monovalent aromatic groups include phenyl, p-phenylphenyl p-tolyl, p-methoxyphenyl, o-chlorophenyl, p-chlorophenyl, p-acetylaminophenyl and m-(3-sulfopropylamino)-phenyl. Examples of the divalent aromatic groups include those obtained by converting these monovalent aromatic groups into divalent groups, and specific examples thereof include phenylene, p-tolylene, p-methoxyphenylene, o-chlorophenylene, m-(3-sulfopropylamino)-phenylene and naphthylene.

Examples of the heterocyclic group include substituted heterocyclic groups and unsubstituted heterocyclic groups. An alicyclic ring, aromatic ring or another heterocyclic ring may be condensed with the heterocyclic ring. The heterocyclic ring is favorably a 5-membered or 6-membered heterocyclic ring. Examples of a heteroatom of the heterocyclic ring include nitrogen, oxygen and sulfur atoms. Specific examples of the substituent include aliphatic groups, halogen atoms, alkyl- or arylsulfonyl groups, acryl group, acylamino group, sulfamoyl group, carbamoyl group and ionic hydrophilic groups. Examples of a monovalent heterocyclic group include 2-pyridyl, 3-pyridyl, 2-thienyl, 2-thiazolyl, 2-benzothiazolyl, 2-benzoxazolyl and 2-furyl. Examples of a divalent heterocyclic group include groups obtained by removing a hydrogen atom from the monovalent heterocyclic groups.

Examples of the carbamoyl group include substituted and unsubstituted carbamoyl groups. Specific examples of the substituent include alkyl groups. Specific examples of the carbamoyl group include methylcarbamoyl and dimethylcarbamoyl groups.

Examples of the alkoxycarbonyl group include substituted and unsubstituted alkoxycarbonyl groups. The alkoxycarbonyl group is favorably an alkoxycarbonyl group having 2 to 20 carbon atoms. Specific examples of the substituent include ionic hydrophilic groups. Specific examples of the alkoxycarbonyl group include methoxycarbonyl and ethoxycarbonyl groups.

Examples of the aryloxycarbonyl group include substituted and unsubstituted aryloxycarbonyl groups. The aryloxycarbonyl group is favorably an aryloxycarbonyl group having 7 to 20 carbon atoms. Specific examples of the substituent include ionic hydrophilic groups. Specific examples of the aryloxycarbonyl group include a phenoxycarbonyl group.

Examples of the heterocyclic oxycarbonyl group include substituted and unsubstituted heterocyclic oxycarbonyl groups. The heterocyclic oxycarbonyl group is favorably a heterocyclic oxycarbonyl group having 2 to 20 carbon atoms. Specific examples of the substituent include ionic hydrophilic groups. Specific examples of the heterocyclic oxycarbonyl group include 2-pyridyloxycarbonyl group.

Examples of the acyl group include substituted and unsubstituted acyl groups. The acyl group is favorably an acyl group having 1 to 20 carbon atoms. Specific examples of the substituent include ionic hydrophilic groups. Specific examples of the acyl group include acetyl and benzoyl groups.

Examples of the alkoxy group include substituted and unsubstituted alkoxy groups. The alkoxy group is favorably an alkoxy group having 1 to 20 carbon atoms. Specific examples of the substituent include alkoxy, hydroxyl and ionic hydrophilic groups. Specific examples of the alkoxy group include methoxy, ethoxy, isopropoxy, methoxyethoxy, hydroxyethoxy and 3-carboxypropoxy groups.

Examples of the aryloxy group include substituted and unsubstituted aryloxy groups. The aryloxy group is favorably an aryloxy group having 6 to 20 carbon atoms. Specific examples of the substituent include alkoxy and ionic hydrophilic groups. Specific examples of the aryloxy group include phenoxy, p-methoxyphenoxy and o-methoxy-phenoxy groups.

Examples of the heterocyclic oxy group include substituted and unsubstituted heterocyclic oxy groups. The heterocyclic oxy group is favorably a heterocyclic oxy group having 2 to 20 carbon atoms. Specific examples of the substituent include alkyl, alkoxy and ionic hydrophilic groups. Specific examples of the heterocyclic oxy group include 3-pyridyloxy and 3-thienyloxy groups.

The silyloxy group is favorably a silyloxy group substituted by an aliphatic group having 1 to 20 carbon atoms and/or an aromatic group. Specific examples of the silyloxy group include trimethylsilyloxy and diphenylmethylsilyloxy groups.

Examples of the acyloxy group include substituted and unsubstituted acyloxy groups. The acyloxy group is favorably an acyloxy group having 1 to 20 carbon atoms. Specific examples of the substituent include ionic hydrophilic groups. Specific examples of the acyloxy group include acetoxy and benzoyloxy groups.

Examples of the carbamoyloxy group include substituted and unsubstituted carbamoyloxy groups. Specific examples of the substituent include alkyl groups. Specific examples of the carbamoyloxy group include an N-methylcarbamoyloxy group.

Examples of the alkoxycarbonyloxy group include substituted and unsubstituted alkoxycarbonyloxy groups. The alkoxycarbonyloxy group is favorably an alkoxycarbonyloxy group having 2 to 20 carbon atoms. Specific examples of the alkoxycarbonyloxy group include methoxycarbonyloxy and isopropoxycarbonyloxy groups.

Examples of the aryloxycarbonyloxy group include substituted and unsubstituted aryloxycarbonyloxy groups. The aryloxycarbonyloxy group is favorably an aryloxycarbonyloxy group having 7 to 20 carbon atoms. Specific examples of the aryloxycarbonyloxy group include a phenoxycarbonyloxy group.

The amino group includes amino groups substituted by an alkyl, aryl or heterocyclic group, and the alkyl, aryl and heterocyclic groups may be further substituted. The alkylamino group is favorably an alkylamino group having 1 to 20 carbon atoms. Specific examples of the substituent include ionic hydrophilic groups. Specific examples of the alkylamino group include methylamino and diethylamino groups. Examples of the arylamino group include substituted and unsubstituted arylamino groups. The arylamino group is favorably an arylamino group having 6 to 20 carbon atoms. Specific examples of the substituent include halogen atoms and ionic hydrophilic groups. Specific examples of the arylamino group include anilino and 2-chlorophenylamino groups. Examples of the heterocyclic amino group include substituted and unsubstituted heterocyclic amino groups. The heterocyclic amino group is favorably a heterocyclic amino group having 2 to 20 carbon atoms. Specific examples of the substituent include alkyl groups, halogen atoms and ionic hydrophilic groups.

Examples of the acylamino group include substituted and unsubstituted acylamino groups. The acylamino group is favorably an acylamino group having 2 to 20 carbon atoms. Specific examples of the substituent include ionic hydrophilic groups. Specific examples of the acylamino group include acetylamino, propionylamino, benzoylamino, N-phenylacetylamino and 3,5-disulfobenzoylamino groups.

Examples of the ureido group include substituted and unsubstituted ureido groups. The ureido group is favorably a ureido group having 1 to 20 carbon atoms. Specific examples of the substituent include alkyl and aryl groups. Specific examples of the ureido group include 3-methylureido, 3,3-dimethylureido and 3-phenylureido groups.

Examples of the sulfamoylamino group include substituted and unsubstituted sulfamoylamino groups. Specific examples of the substituent include alkyl groups. Specific examples of the sulfamoylamino group include an N,N-dipropylsulfamoylamino group.

Examples of the alkoxycarbonylamino group include substituted and unsubstituted alkoxycarbonylamino groups. The alkoxycarbonylamino group is favorably an alkoxycarbonylamino group having 2 to 20 carbon atoms. Specific examples of the substituent include ionic hydrophilic groups. Specific examples of the alkoxycarbonylamino group include an ethoxycarbonylamino group.

Examples of the aryloxycarbonylamino group include substituted and unsubstituted aryloxycarbonylamino groups. The aryloxycarbonylamino group is favorably an aryloxycarbonylamino group having 7 to 20 carbon atoms. Specific examples of the substituent include ionic hydrophilic groups. Specific examples of the aryloxycarbonylamino group include a phenoxycarbonylamino group.

Examples of the alkyl- or arylsulfonylamino group include substituted and unsubstituted alkyl- or arylsulfonylamino groups. The sulfonylamino group is favorably a sulfonylamino group having 1 to 20 carbon atoms. Specific examples of the substituent include ionic hydrophilic groups. Specific examples of the sulfonylamino group include methylsulfonylamino, N-phenyl-methylsulfonyl, phenylsulfonylamino and 3-carboxyphenylsulfonylamino groups.

Examples of the heterocyclic sulfonylamino group include substituted and unsubstituted heterocyclic sulfonylamino groups. The heterocyclic sulfonylamino group is favorably a heterocyclic sulfonylamino group having 1 to 12 carbon atoms. Specific examples of the substituent include ionic hydrophilic groups. Specific examples of the heterocyclic sulfonylamino group include 2-thiophenesulfonylamino and 3-pyridylsulfonylamino groups.

Examples of the alkyl- or arylthio group include substituted and unsubstituted alkyl- or arylthio groups. The alkyl- or arylthio group favorably has 1 to 20 carbon atoms. Specific examples of the substituent include ionic hydrophilic groups. Specific examples of the alkyl- or arylthio group include methylthio and phenylthio groups.

Examples of the heterocyclic thio group include substituted and unsubstituted heterocyclic thio groups. The heterocyclic thio group favorably has 1 to 20 carbon atoms. Specific examples of the substituent include ionic hydrophilic groups. Specific examples of the heterocyclic thio group include a 2-pyridylthio group.

Examples of the alkyl- or arylsulfonyl group include substituted and unsubstituted alkyl- or arylsulfonyl groups. Specific examples of the alkyl- or arylsulfonyl group include methylsulfonyl and phenylsulfonyl groups.

Examples of the heterocyclic sulfonyl group include substituted and unsubstituted heterocyclic sulfonyl groups. The heterocyclic sulfonyl group favorably has 1 to 20 carbon atoms. Specific examples of the substituent include ionic hydrophilic groups. Specific examples of the heterocyclic sulfonyl group include 2-thiophenylsulfonyl and 3-pyridinesulfonyl groups.

Examples of the alkyl- or arylsulfinyl group include substituted and unsubstituted alkyl- or arylsulfinyl groups. Specific examples of the alkyl- or arylsulfinyl group include methylsulfinyl and phenylsulfinyl groups.

Examples of the heterocyclic sulfinyl group include substituted and unsubstituted heterocyclic sulfinyl groups. The heterocyclic sulfinyl group favorably has 1 to 20 carbon atoms. Specific examples of the substituent include ionic hydrophilic groups. Specific examples of the heterocyclic sulfinyl group include a 4-pyridinesulfinyl group.

Examples of the sulfamoyl group include substituted and unsubstituted sulfamoyl groups. Specific examples of the substituent include alkyl groups. Specific examples of the sulfamoyl group include dimethylsulfamoyl and di-(2-hydroxyethyl)sulfamoyl groups.

M's in the general formula (I) are, independently of each other, a hydrogen atom, alkali metal, ammonium or organic ammonium. Specific examples of the alkali metal include lithium, sodium and potassium. Specific examples of the organic ammonium include acetamido, benzamido, methylamino, butylamino, diethylamino, phenylamino and triethanolamine.

The compound of the general formula (I) used in the present invention is favorably such that A is a naphthyl group, which may be substituted, B is a group represented by the general formula (2), and further favorably such that $R_3$ in the general formula (2) is an aryl group or an pyridyl group. Specific favorable examples of the aryl group or an pyridyl group include phenyl, 2-methylphenyl, 3-methylphenyl, 4-methylphenyl, 2,3-dimethylphenyl, 2,4-dimethylphenyl, 2,5-dimethylphenyl, 3,4-dimethylphenyl, 2,6-dimethylphenyl, 3,5-dimethylphenyl, 2,4,6-trimethylphenyl, 2,3,4-trimethyl-phenyl, 2,3,5-trimethylphenyl, 2,3,6-trimethylphenyl, 2-chlorophenyl, 3-chlorophenyl, 4-chlorophenyl, 2-ethylphenyl, 3-ethylphenyl, 4-ethylphenyl, 2-pyridyl, 3-pyridyl, 4-pyridyl, 1-naphthyl and 2-naphthyl groups. Among these groups, phenyl, 3-methylphenyl, 4-methylphenyl, 2-chlorophenyl, 3-chlorophenyl, 2-pyridyl, 4-pyridyl, 1-naphthyl and 2-naphthyl groups are favorable.

The compound of the general formula (I) favorably has a maximum absorption wavelength ($\lambda_{max}$) of 590 nm or more and 620 nm or less in an absorption spectrum measured by using water as a solvent.

Specific favorable examples of the compound of the general formula (I) include the following Exemplified Compounds I-1 to I-12. Incidentally, the compounds of the general formula (I) in the present invention are not limited to the following Exemplified Compounds so far as the compounds are embraced in the structure of the general formula (I). Among the following Exemplified Compounds, Exemplified Compounds I-3, I-5, I-6, I-8, I-9, I-10, I-11 and I-12 are favorably used in the present invention, and Exemplified Compounds I-3, I-5 and I-10 are more favorably used.

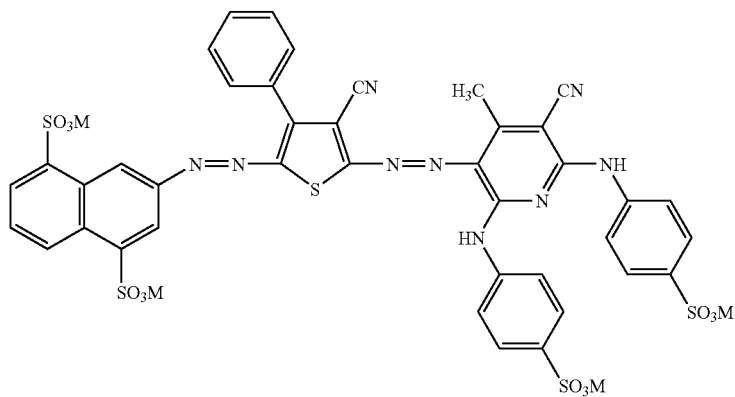
Exemplified Compound I-1
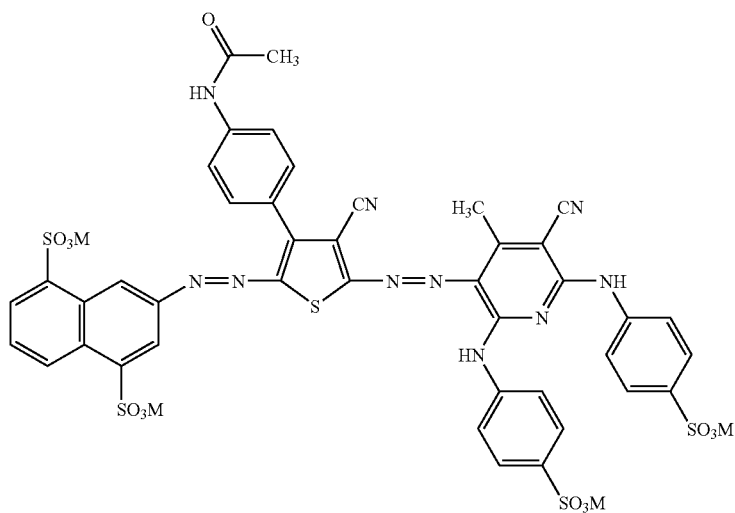
Exemplified Compound I-2
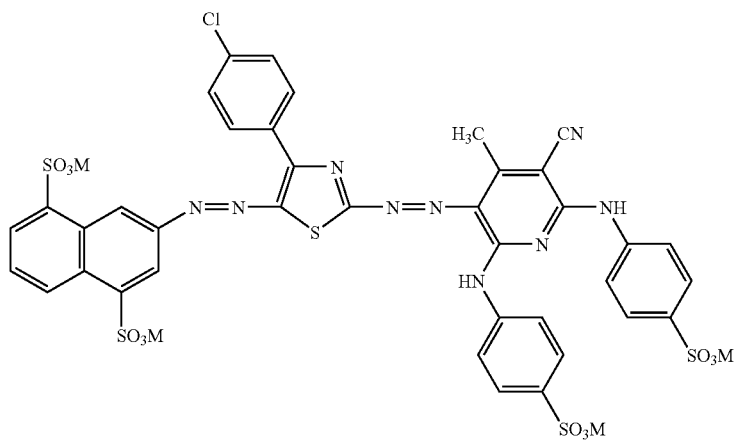
Exemplified compound I-3

-continued
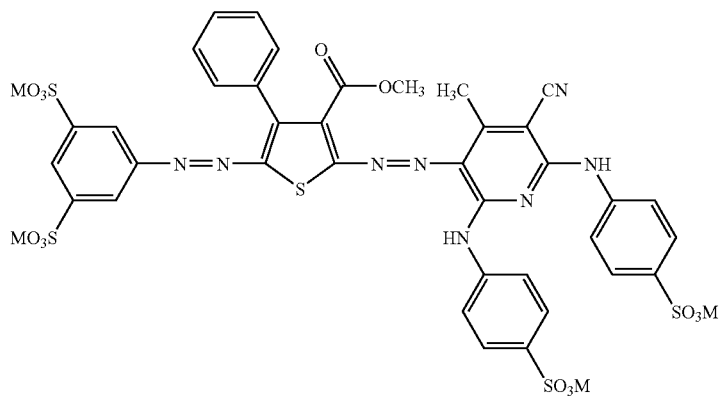
Exemplified compound I-4
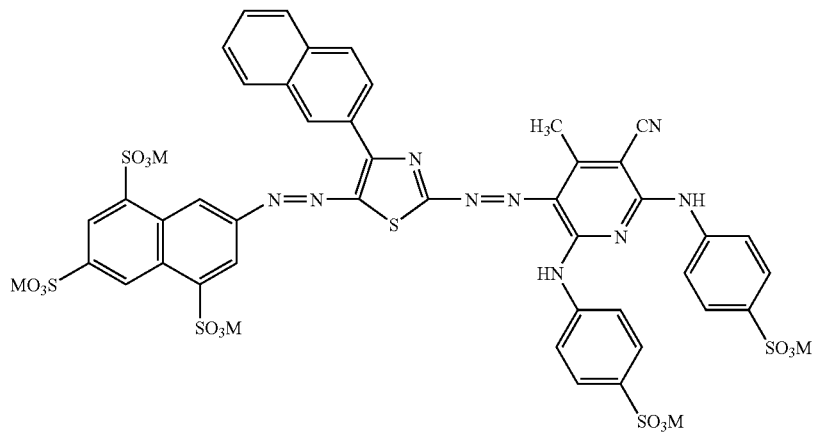
Exemplified compound I-5
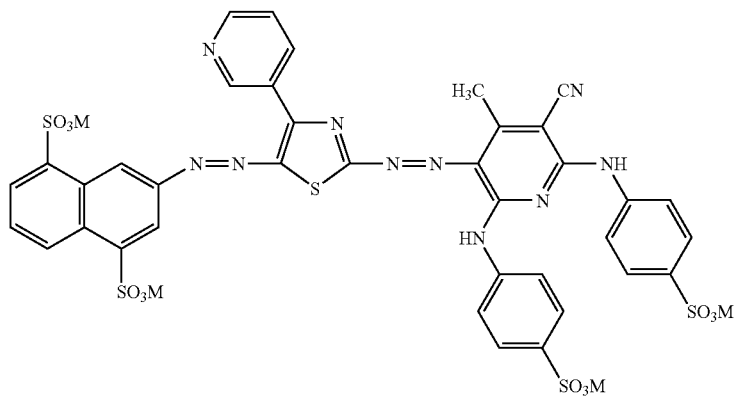
Exemplified compound I-6
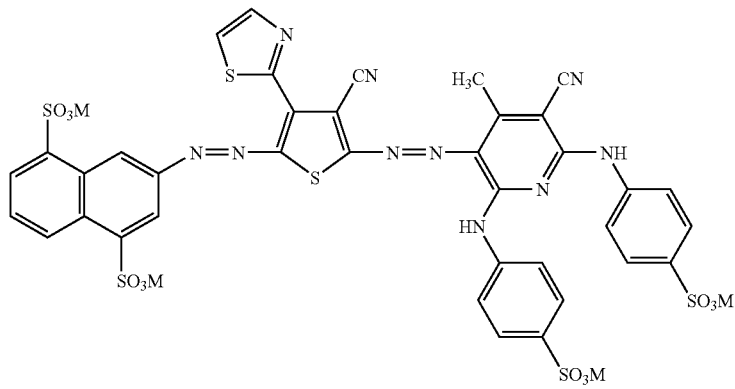
Exemplified compound I-7

-continued
Exemplified compound I-8
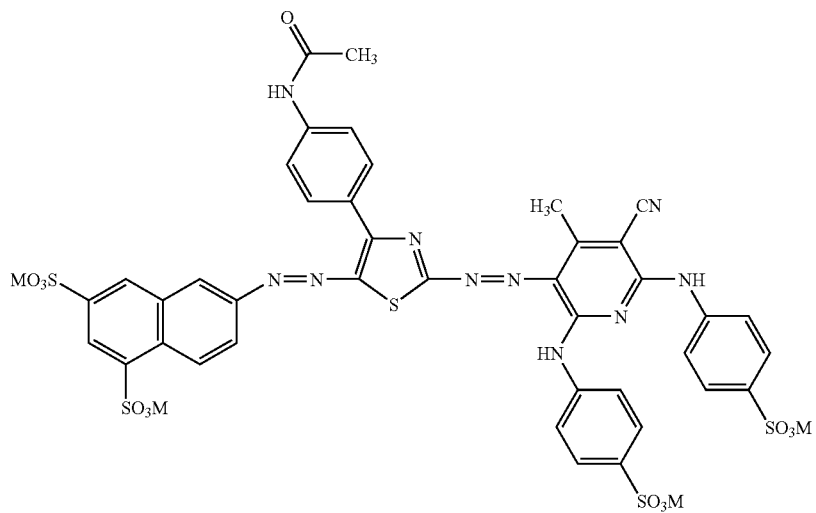
Exemplified compound I-9
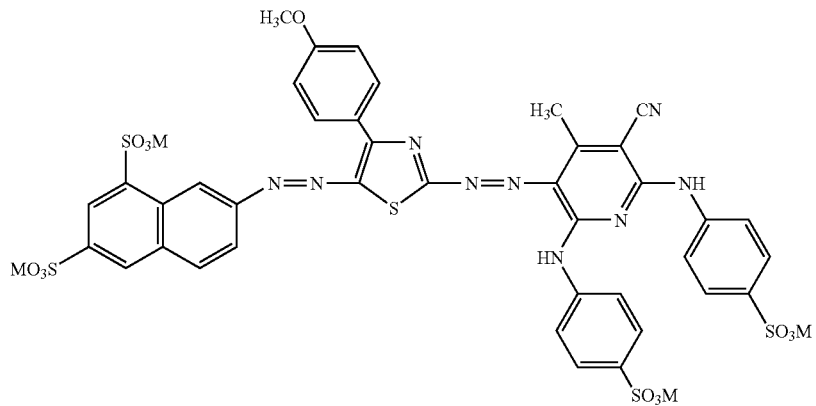
Exemplified compound I-10
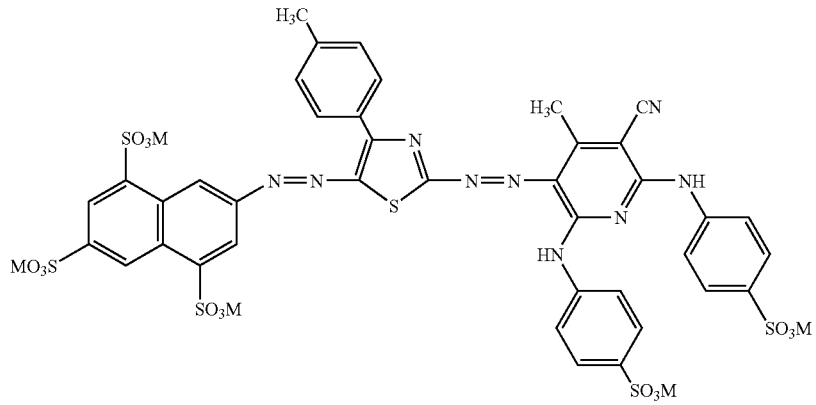

Exemplified compound I-11

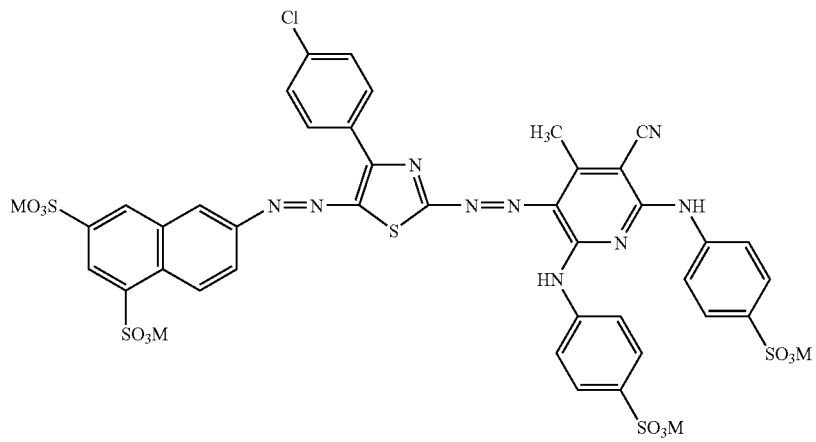

Exemplified compound I-12

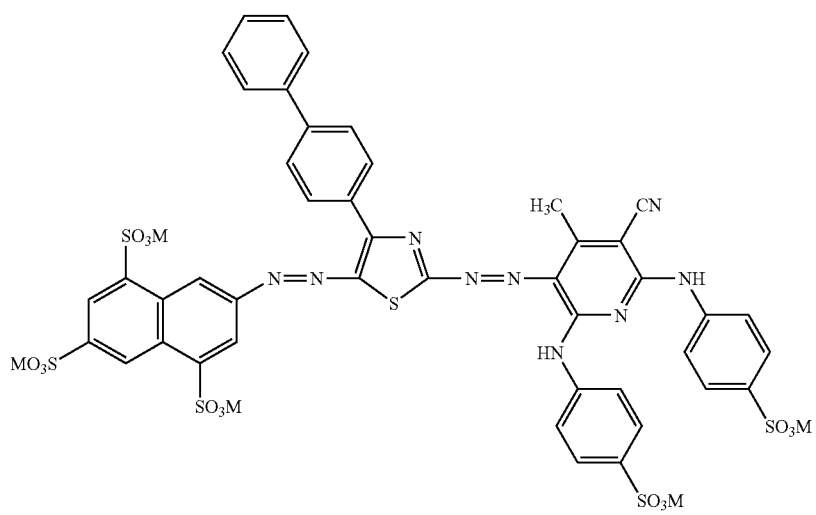

[Second Coloring Material; Compound Represented by the General Formula (II)]

The ink according to the present invention requires containing the compound of the following general formula (II) as the second coloring material.

General formula (II)

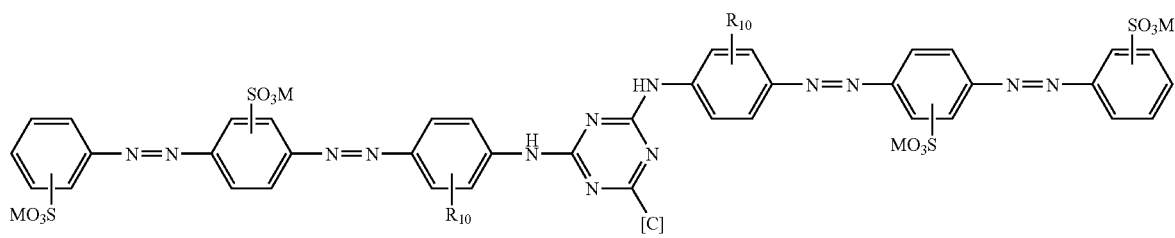

wherein groups $R_{10}$ are, independently of each other, a hydrogen atom, a hydroxyl group, a carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5)alkylamino group, a bis[carboxy-(C1-C5) alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group, C is an aliphatic amine residue having a carboxyl or sulfonic group, and M's are, independently of one another, a hydrogen atom, alkali metal, ammonium or organic ammonium.

Groups $R_{10}$ in the general formula (II) are, independently of each other, a hydrogen atom, a hydroxyl group, a carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5)alkylamino group, a bis[carboxy-(C1-C5)alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group.

Specific examples of the alkyl group having 1 to 4 carbon atom, which may be substituted by a hydroxyl group or an alkoxy group having 1 to 4 carbon atoms, include methyl, ethyl, n-propyl, isopropyl, n-butyl, isobutyl, sec-butyl, tert-butyl, methoxyethyl, ethoxyethyl, n-propoxyethyl, isopropoxyethyl, n-butoxyethyl, sec-butoxy-ethyl, tert-butoxyethyl and 2-hydroxyethyl.

Specific examples of the alkoxy group having 1 to 4 carbon atoms, which may be substituted by a hydroxyl group or an alkoxy group having 1 to 4 carbon atoms, include methoxy, ethoxy, n-propoxy, isopropoxy, n-butoxy, sec-butoxy, tert-butoxy, 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy and 2-hydroxyethoxyethoxy.

Specific examples of the alkylamino group having 1 to 4 carbon atom, which may be substituted by a hydroxyl group or an alkoxy group having 1 to 4 carbon atoms, include methylamino, ethylamino, n-propylamino, isopropyl-amino, n-butylamino, isobutylamino, N,N-dimethylamino, N,N-diethylamino, N,N-di(n-propyl)amino, N,N-di(isopropyl)amino, hydroxyethylamino, 2-hydroxypropylamino, 3-hydroxypropyl-amino, bis(hydroxyethyl)amino, methoxyethylamino, ethoxy-ethylamino, bis(methoxyethyl)amino and bis(2-ethoxyethyl)-amino.

Specific examples of the carboxy-(C1-C5)alkylamino group include carboxymethylamino, carboxyethylamino, carboxypropylamino, carboxy-n-butylamino and carboxy-n-pentylamino.

Specific examples of the bis[carboxy-(C1-C5)-alkyl] amino group include bis(carboxymethyl)amino, bis(carboxymethyl)amino and bis(carboxypropyl)amino.

Specific examples of the alkanoylamino group having 1 to 4 carbon atom, which may be substituted by a hydroxyl group or an alkoxy group having 1 to 4 carbon atoms, include acetylamino, n-propionylamino, isopropionylamino, hydroxyacetylamino, 2-hydroxy-n-propionylamino, 3-hydroxy-n-propionylamino, 2-methoxy-n-propionylamino, 3-methoxy-n-propionylamino, 2-hydroxy-n-butyrylamino, 3-hydroxy-n-butyrylamino, 2-methoxy-n-butyrylamino and 3-methoxy-n-butyrylamino.

Specific examples of the phenylamino group, which may be substituted by a carboxyl, sulfonic or amino group, include phenylamino, sulfophenylamino, carboxyphenylamino, bis-carboxyphenylamino, aminophenylamino, diaminophenylamino and diaminosulfophenylamino.

Specific examples of the halogen atom include chlorine, bromine and iodine atoms. Among these, the chlorine or bromine atom is favorable, and the chlorine atom is particularly favorable.

Specific examples of the ureido group include 3-methylureido, 3,3-dimethylureido and 3-phenylureido groups.

[C] in the general formula (II) is an aliphatic amine residue having a carboxyl or sulfonic group. The aliphatic amine residue is favorably a mono(C1-C5)alkylamine residue or di(C1-C5)alkylamine residue having a carboxyl or sulfonic group. Specific examples of the aliphatic amine residue having a carboxyl or sulfonic group include amino-(C1-C5) alkylsulfonic acid, diimino-(C1-C5)alkylsulfonic acid, amino-(C1-C5)alkylcarboxylic acid and diimino-(C1-C5) alkylcarboxylic acid. Among these, the amine residues whose aliphatic group has 1 or 2 carbon atoms are favorable. Sulfo-ethylamino and dicarboxymethylimino groups are particularly favorable as the aliphatic amine residue, and the sulfo-ethylamino group is further favorable.

M's in the general formula (II) are, independently of one another, a hydrogen atom, alkali metal, ammonium or organic ammonium. Specific examples of the alkali metal include lithium, sodium and potassium. Specific examples of the organic ammonium include acetamido, benzamido, methylamino, butylamino, diethylamino and phenylamino.

The compound of the general formula (II) used in the present invention is favorably such that $R_{10}$ is an alkyl having 1 to 4 carbon atoms, and more favorably such that $R_{10}$ is a methyl group. Incidentally, in the general formula (II), in the two benzene ring substituted by groups $R_{10}$, each benzene ring preferably has one $R_{10}$, and in the four benzene ring substituted by sulfonic acid group (—$SO_3M$), each benzene ring preferably has one sulfonic acid group.

The compound of the general formula (II) favorably has a maximum absorption wavelength ($\lambda_{max}$) of 400 nm or more and 440 nm or less in an absorption spectrum measured by using water as a solvent.

Specific favorable examples of the compound of the general formula (II) include the following Exemplified Compounds II-1 to II-12. Exemplified Compounds II-1 to II-12 are compounds of the following general formula (7) of which [C] is the aliphatic amine residues shown in the following Table 1. Incidentally, the compounds of the general formula (II) in the present invention are not limited to the following Exemplified Compounds so far as the compounds are embraced in the structure of the general formula (II). Among the following Exemplified Compounds, Exemplified Compounds II-1, II-5 and II-9 are favorably used in the present invention.

General formula (7)

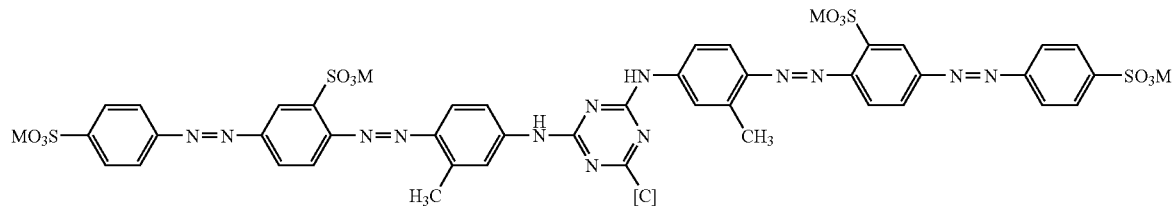

wherein M's are, independently of one another, a hydrogen atom, alkali metal, ammonium or organic ammonium.

TABLE 1

Exemplified Compounds of general formula (II)

| Exemplified Compound | [C] in general formula (II) |
|---|---|
| II-1 | $NH(CH_2)_2SO_3M$ |
| II-2 | $NH((CH_2)_2COOM)_2$ |
| II-3 | $NH(CH_2)_2COOM$ |
| II-4 | $NH(CH_2)_5COOM$ |
| II-5 | $NHCH_2SO_3M$ |
| II-6 | $N(CH_2SO_3M)_2$ |
| II-7 | $N((CH_2)_2SO_3M)_2$ |
| II-8 | $NHCH_2COOM$ |
| II-9 | $N(CH_2COOM)_2$ |
| II-10 | $N((CH_2)_3COOM)_2$ |
| II-11 | $NH(CH_2)_3SO_3M$ |
| II-12 | $N((CH_2)_3SO_3M)_2$ |

[Third Coloring Material; Compound Represented by the General Formula (III)]

The ink according to the present invention requires containing the compound of the following general formula (III) as the third coloring material.

General formula (III)

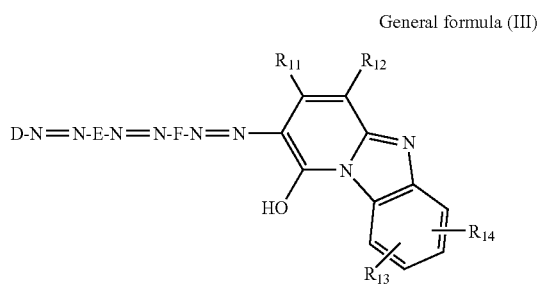

wherein D is a phenyl group having a substituent selected from the group consisting of a carboxyl group, a sulfonic group, a chlorine atom, a cyano group, a nitro group, a sulfamoyl group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group, E and F are, independently of each other, a paraphenylene group having a substituent selected from the group consisting of a carboxyl group, a sulfonic group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group, $R_{11}$ is an alkyl group having 1 to 4 carbon atoms, which may be substituted by a carboxyl group, a phenyl group, which may be substituted by a sulfonic group, or a carboxyl group, $R_{12}$ is a cyano group, carbamoyl group or carboxyl group, and $R_{13}$ and $R_{14}$ are, independently of each other, a hydrogen atom, methyl group, chlorine atom or sulfonic group.

D in the general formula (III) is a substituted phenyl group having a substituent selected from the group consisting of a carboxyl group, a sulfonic group, a chlorine atom, a cyano group, a nitro group, a sulfamoyl group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group.

Specific examples of the alkyl group having 1 to 4 carbon atoms include methyl, ethyl, n-propyl, isopropyl, n-butyl, isobutyl, sec-butyl and tert-butyl.

Specific examples of the alkoxy group having 1 to 4 carbon atoms, which may be substituted by a hydroxyl group, an alkoxy group having 1 to 4 carbon atoms, a sulfonic group or a carboxyl group, include methoxy, ethoxy, n-propoxy, isopropoxy, n-butoxy, sec-butoxy, tert-butoxy, 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxy-propoxy, isopropoxybutoxy, n-propoxybutoxy, 2-hydroxy-ethoxyethoxy, carboxymethoxy, 2-carboxyethoxy, 3-carboxy-propoxy, 3-sulfopropoxy and 4-sulfobutoxy.

Specific examples of the alkylsulfonyl group having 1 to 4 carbon atoms, which may be substituted by a hydroxyl group, sulfonic group or carboxyl group, include methylsulfonyl, ethylsulfonyl, propylsulfonyl, butyl-sulfonyl, hydroxyethyl-sulfonyl, 2-hydroxypropylsulfonyl, 2-sulfoethylsulfonyl, 3-sulfopropylsulfonyl, 2-carboxyethyl-sulfonyl and 3-carboxypropylsulfonyl.

E and F in the general formula (III) are, independently of each other, a paraphenylene group having a substituent. The substituent is selected from the group consisting of a carboxyl group, a sulfonic group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group.

In the above, specific examples of the alkyl group having 1 to 4 carbon atoms include methyl, ethyl, n-propyl, isopropyl, n-butyl, isobutyl, sec-butyl and tert-butyl.

Specific examples of the alkoxy group having 1 to 4 carbon atoms, which may be substituted by a hydroxyl group, an alkoxy group having 1 to 4 carbon atoms, a sulfonic group or a carboxyl group, include methoxy, ethoxy, n-propoxy, isopropoxy, n-butoxy, sec-butoxy, tert-butoxy, 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxy-propoxy, isopropoxybutoxy, n-propoxybutoxy, 2-hydroxy-ethoxyethoxy, carboxymethoxy, 2-carboxyethoxy, 3-carboxy-propoxy, 3-sulfopropoxy and 4-sulfobutoxy.

Specific examples of the alkylsulfonyl group having 1 to 4 carbon atoms, which may be substituted by a hydroxyl group, sulfonic group or carboxyl group, include methylsulfonyl, ethylsulfonyl, propylsulfonyl, butyl-sulfonyl, hydroxyethylsulfonyl, 2-hydroxypropylsulfonyl, 2-sulfoethylsulfonyl, 3-sulfopropylsulfonyl, 2-carboxyethyl-sulfonyl and 3-carboxypropylsulfonyl.

$R_{11}$ in the general formula (III) is an alkyl group having 1 to 4 carbon atoms, which may be substituted by a carboxyl group, a phenyl group, which may be substituted by a sulfonic group, or a carboxyl group.

Specific examples of the alkyl group having 1 to 4 carbon atoms, which may be substituted by a carboxyl group, include methyl, ethyl, n-propyl, isopropyl, n-butyl, isobutyl, sec-butyl, tert-butyl, carboxymethyl and 2-carboxyethyl.

Specific examples of the phenyl group, which may be substituted by a sulfonic group, include phenyl, 3-sulfo-phenyl, 4-sulfophenyl, 2,4-disulfophenyl and 3,5-disulfo-phenyl.

$R_{12}$ in the general formula (III) is a cyano group, carbamoyl group or carboxyl group. $R_{13}$ and $R_{14}$ in the general formula (III) are, independently of each other, a hydrogen atom, methyl group, chlorine atom or sulfonic group.

In the compound of the general formula (III) used in the present invention, it is favorable that the substituent of D is specifically any one of cyano, carboxyl, sulfonic, sulfamoyl, methylsulfonyl, 2-hydroxyethyl-sulfonyl, 3-sulfopropylsulfonyl, nitro, methyl, methoxy, ethyl, ethoxy, 2-hydroxy-ethoxy, 2-sulfoethoxy, 3-sulfo-propoxy, 4-sulfobutoxy, carboxymethoxy and 2-carboxyethoxy groups. Among the above substituents, the cyano, carboxyl, sulfonic, sulfamoyl, methylsulfonyl, hydroxyethylsulfonyl, 3-sulfopropylsulfonyl or nitro group is particularly favorable. The carboxyl or sulfonic group is further favorable.

In the compound of the general formula (III) used in the present invention, it is favorable that the substituents of E and F (substituted paraphenylene groups) are, independently of each other, specifically any one of carboxyl, sulfonic, methyl, methoxy, ethyl, ethoxy, 2-hydroxyethoxy, 2-sulfoethoxy, 3-sulfopropoxy, 4-sulfobutoxy, carboxymethoxy and 2-carboxyethoxy groups. Among the above substituents, the sulfonic, methyl, methoxy, 2-hydroxy-ethoxy, 2-sulfoethoxy, 3-sulfopropoxy or carboxymethoxy group is particularly favorable. Among these, the sulfonic, methyl, methoxy or 3-sulfopropoxy is further favorable. E and F favorably have, independently of each other, 1 to 3, further favorably 1 or 2 of these substituents.

In the compound of the general formula (III) used in the present invention, it is favorable that the E and F (substituted paraphenylene groups) are, independently of each other a group represented by the following general formula (6).

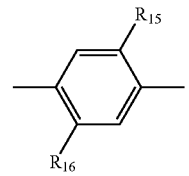

General formula (6)

wherein $R_{15}$ is a sulfonic or sulfopropoxy group, and $R_{16}$ is a hydrogen atom, methyl group, ethyl group, methoxy group or ethoxy group.

A favorable combination of $R_{15}$ and $R_{16}$ in the general formula (6) is such that $R_{15}$ is a sulfonic group and $R_{16}$ is a hydrogen atom, or that $R_{15}$ is a 3-sulfopropoxy groups and $R_{16}$ is a methyl group.

In the compound of the general formula (III) used in the present invention, it is favorable that $R_{11}$ is specifically any one of methyl, ethyl, n-propyl, n-butyl, t-butyl, carboxymethyl, phenyl, 4-sulfophenyl and carboxyl groups. Among the above groups, the methyl, n-propyl, carboxymethyl or 4-sulfophenyl group is particularly favorable. The methyl or n-propyl group is more favorable.

A favorable combination of $R_{11}$ and $R_{12}$, in the compound of the general formula (III) used in the present invention is such that $R_{11}$ is a methyl group and $R_{12}$ is a cyano group, or that $R_{11}$ is a methyl group and $R_{12}$ is a carbamoyl group.

In the compound of the general formula (III) used in the present invention, it is favorable that $R_{13}$ and $R_{14}$ are, independently of each other, a hydrogen atom, methyl group or sulfonic group. A favorable combination of $R_{13}$ and $R_{14}$ in the compound of the general formula (III) is such that $R_{13}$ is a hydrogen atom and $R_{14}$ is a sulfonic group, or that $R_{13}$ is a sulfonic group and $R_{14}$ is a hydrogen atom.

When the compound represented by the general formula (III) is a salt, a cation forming the salt may be an inorganic or organic cation. When the inorganic or organic cation is represented by M, M is a hydrogen atom, alkali metal, ammonium or organic ammonium. Specific examples of the alkali metal include lithium, sodium and potassium. Specific examples of the organic ammonium include acetamido, benzamido, methylamino, butylamino, diethylamino and phenylamino.

The compound of the general formula (III) favorably has a maximum absorption wavelength ($\lambda_{max}$) of 540 nm or more and 570 nm or less in an absorption spectrum measured by using water as a solvent.

Specific favorable examples of the compound of the general formula (III) include the following Exemplified Compounds III-1 to III-20. Incidentally, the following Exemplified Compounds are described in the form of a free acid. Needless to say, the compounds of the general formula (III) in the present invention are not limited to the following Exemplified Compounds so far as the compounds are embraced in the structure of the general formula (III) and definition thereof. Among the following Exemplified Compounds, Exemplified Compounds III-6, III-13, III-15 and III-17 are favorably used in the present invention.

Exemplified compound III-1
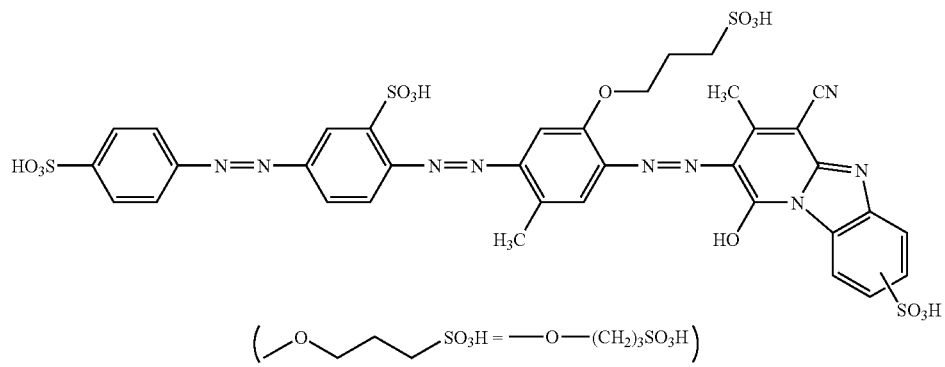
Exemplified compound III-2
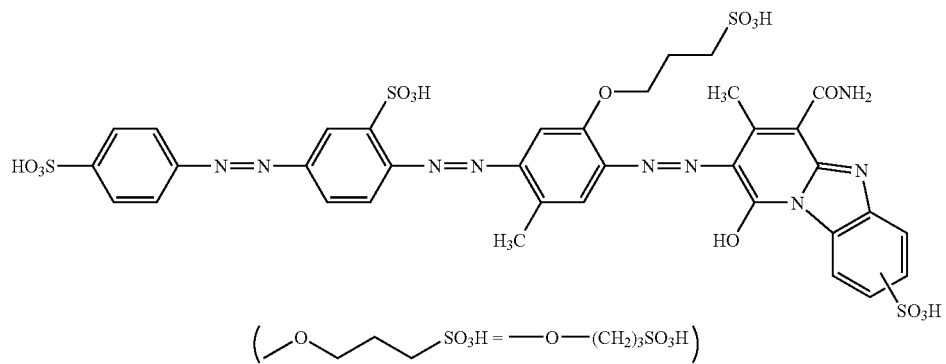
Exemplified compound III-3
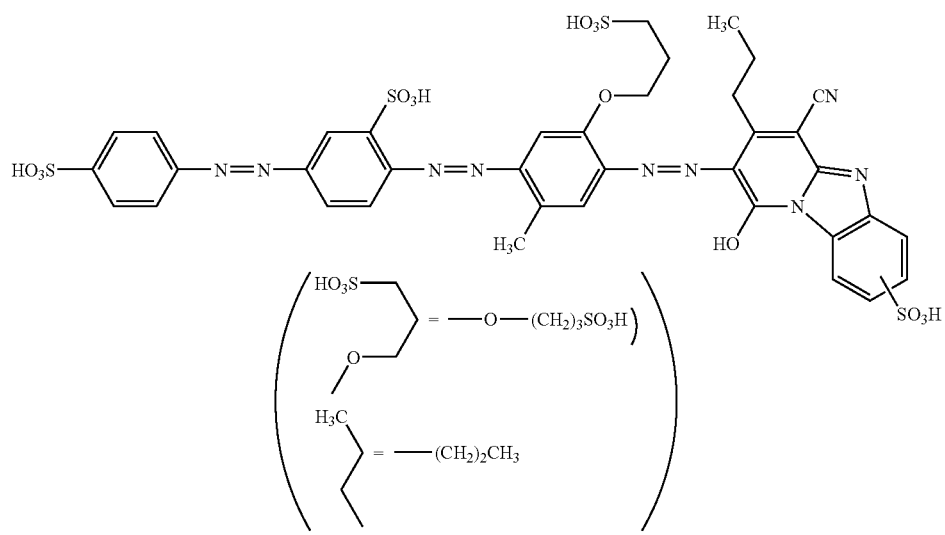

-continued
Exemplified compound III-4
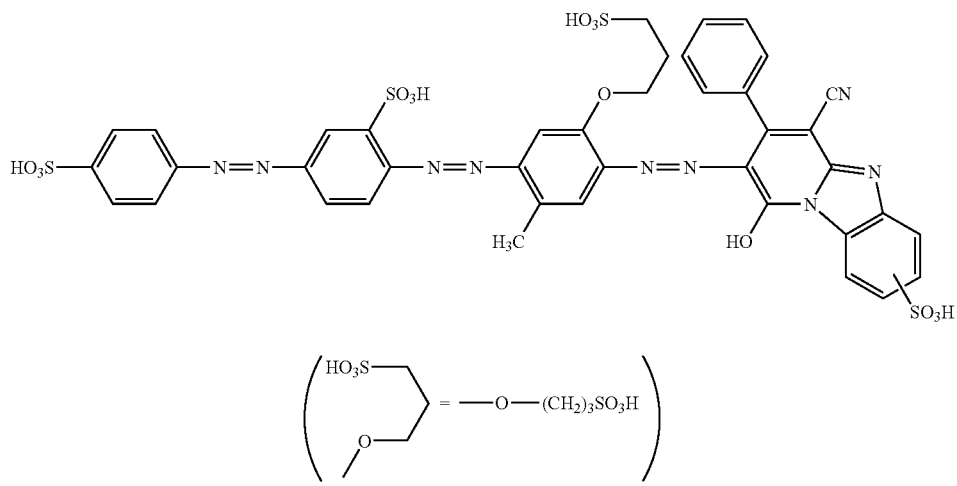
Exemplified compound III-5
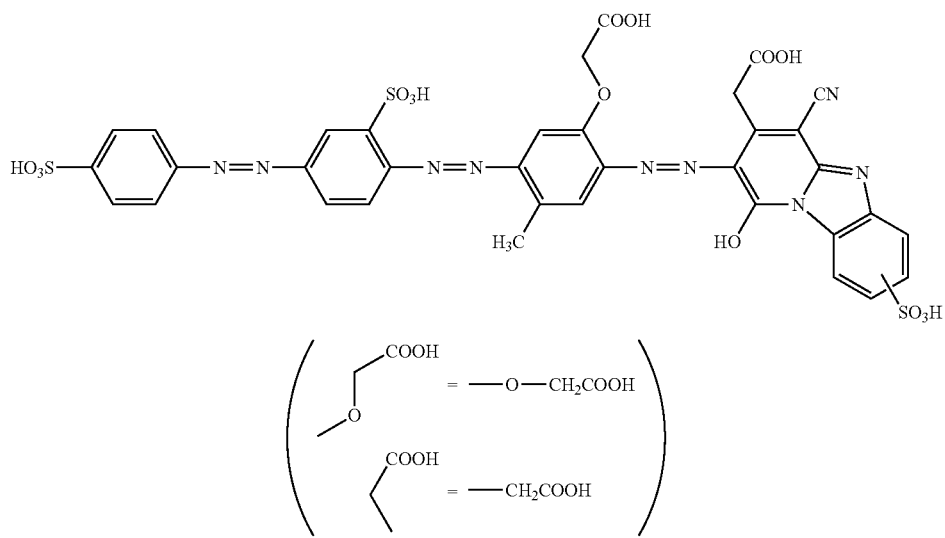
Exemplified compound III-6
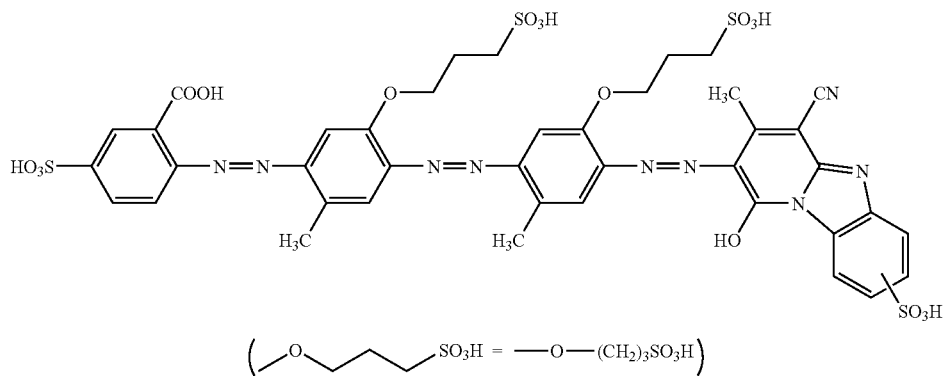

Exemplified compound III-7
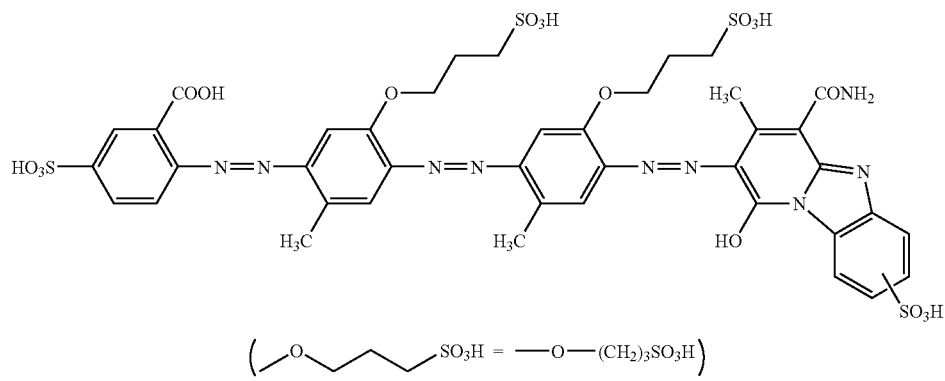
Exemplified compound III-8
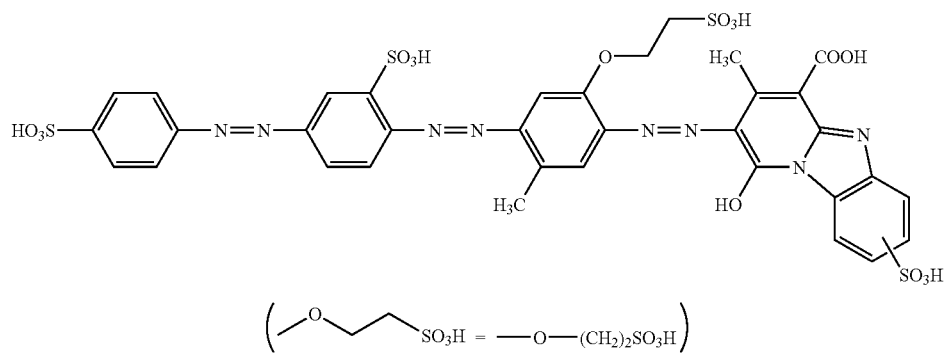
Exemplified compound III-9
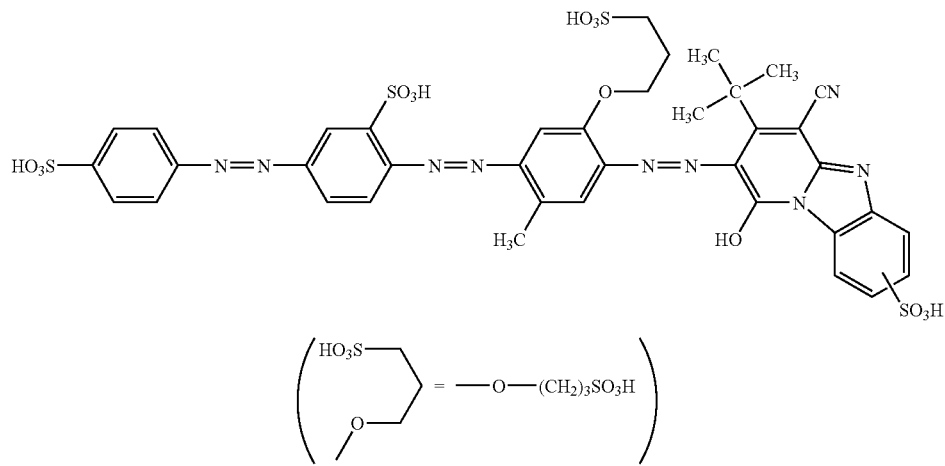

Exemplified compound III-10
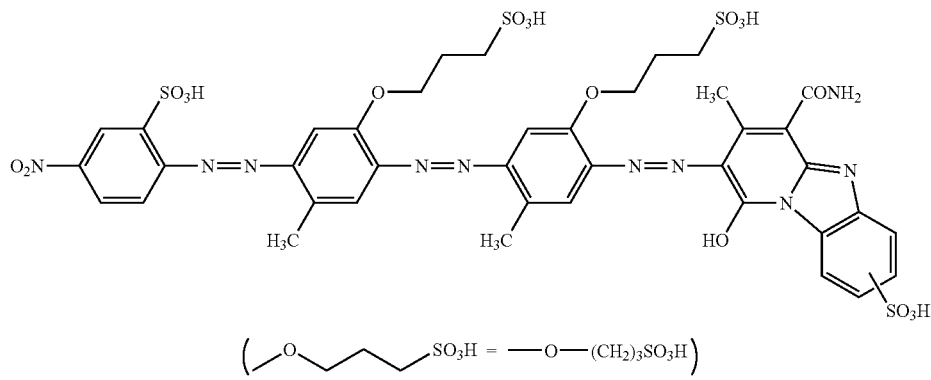
Exemplified compound III-11
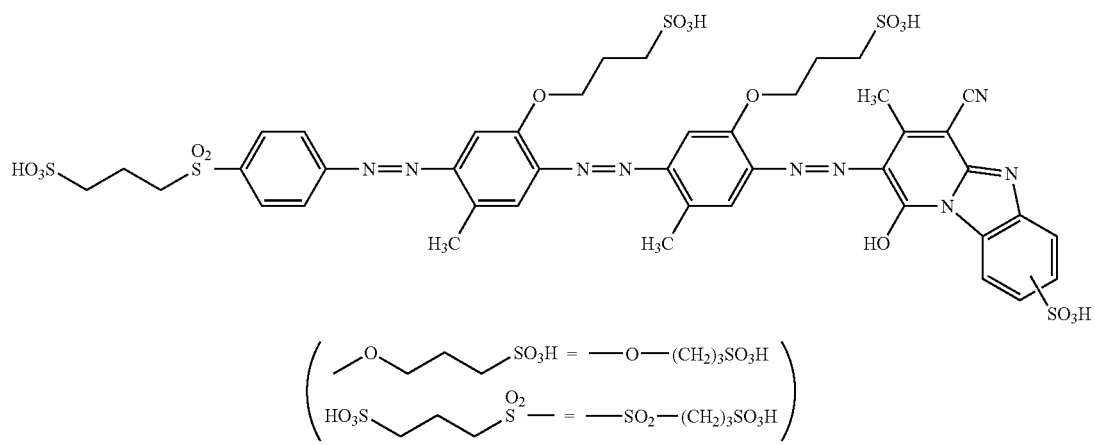
Exemplified compound III-12
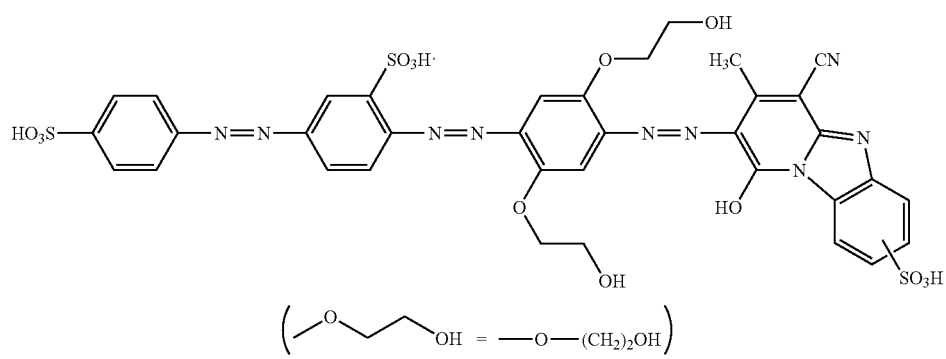
Exemplified compound III-13
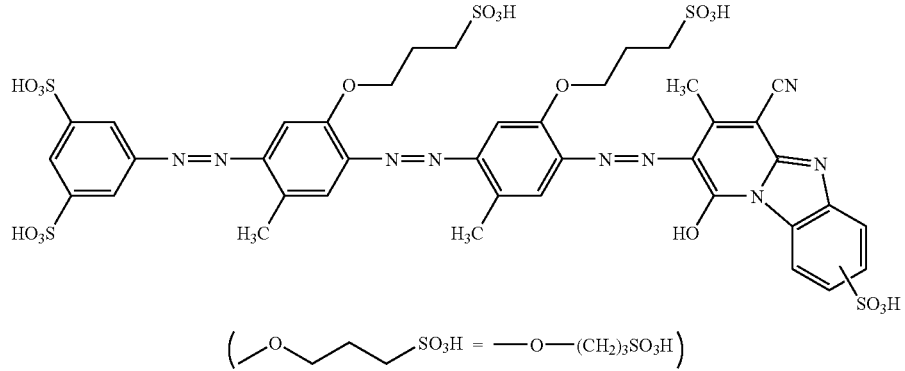

-continued
Exemplified compound III-14
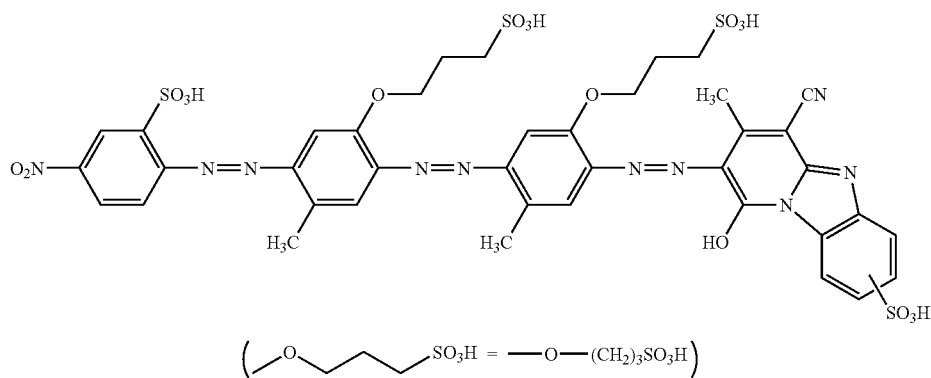
Exemplified compound III-15
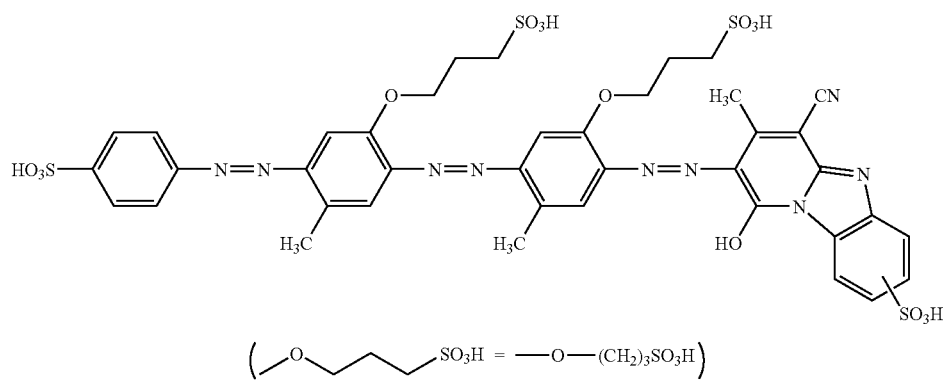
Exemplified compound III-16
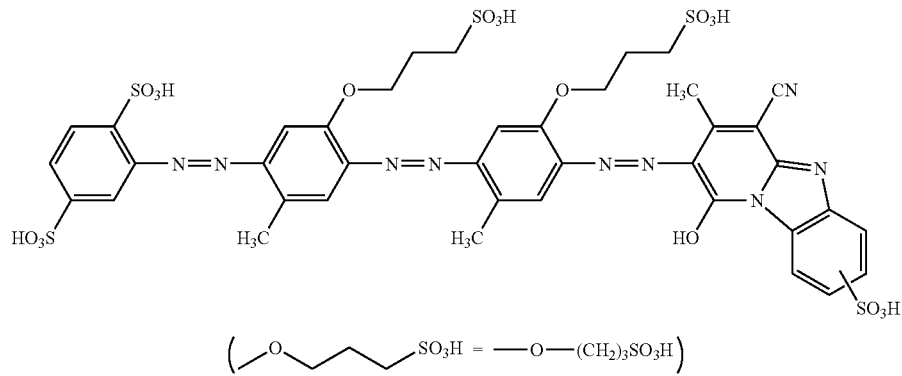
Exemplified compound III-17
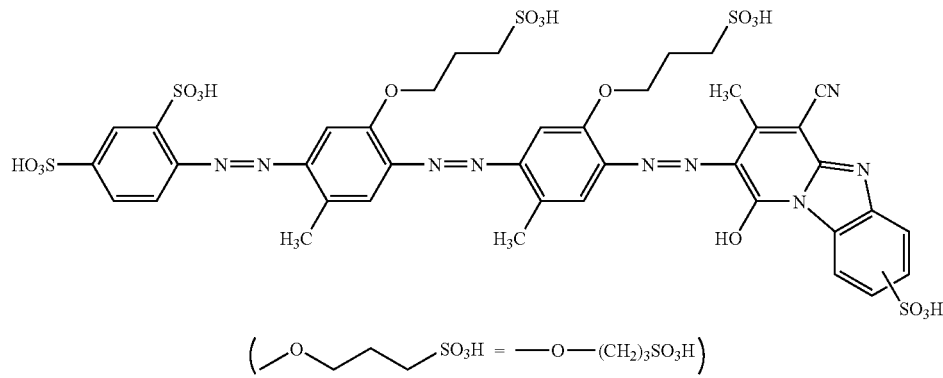

-continued
Exemplified compound III-18
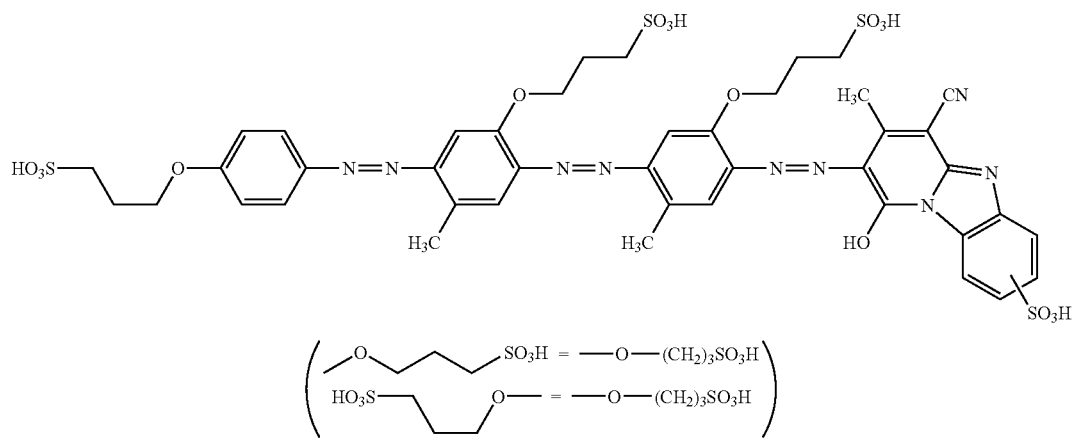
Exemplified compound III-19
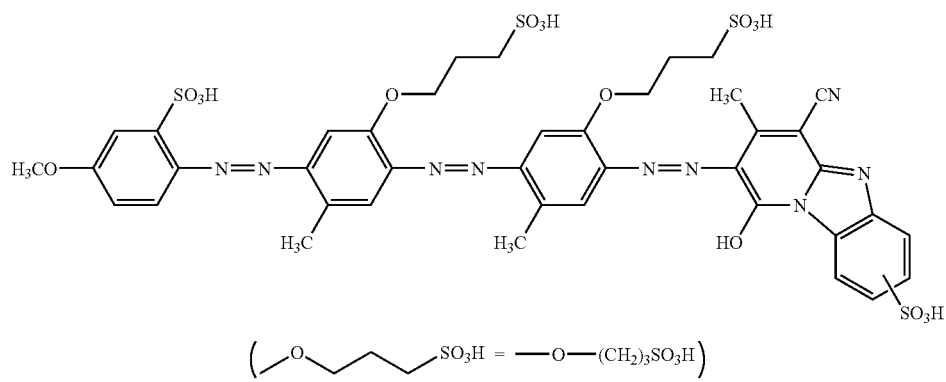
Exemplified compound III-20
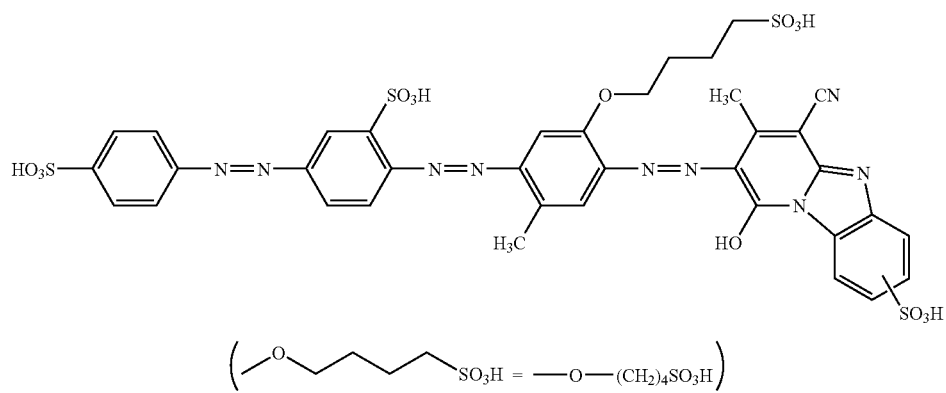

[Verification Method of Coloring Material]

In order to verify whether the coloring materials used in the present invention are contained in an ink or not, the following items (1) to (3) are used for the verification using high performance liquid chromatography (HPLC).

(1) Retention time of peak;
(2) Maximum absorption wavelength on the peak of (1);
(3) M/Z (posi) and M/Z (nega) of mass spectrum on the peak of (1).

Analytic conditions of the high performance liquid chromatography are as follows. First, a liquid (ink) diluted to about 1/1,000 with pure water was prepared and used as a sample for measurement. Analysis by the high performance liquid chromatography was conducted under the following conditions to measure the retention time and maximum absorption wavelength of a peak.

Column: SunFire $C_{18}$ (manufactured by Nihon Waters Co.), 2.1 mm×150 mm, column temperature: 40° C.;
Flow rate: 0.2 mL/min;
PDA: 200 nm to 700 nm;
Mobile phase and gradient conditions: Table 2.

TABLE 2

| Mobile phase and gradient conditions | | | | |
|---|---|---|---|---|
| | 0 to 5 min | 5 to 24 min | 24 to 31 min | 31 to 45 min |
| A: pure water | 85% | 85 → 45% | 45 → 0% | 0% |
| B: methanol | 10% | 10 → 50% | 50 → 95% | 95% |
| C: 0.2 mol/L aqueous solution of ammonium acetate | 5% | 5% | 5% | 5% |

Analytic conditions of the mass spectrum are as follows. With respect to the resultant peak, the mass spectrum is measured under the following conditions to measure M/Z most strongly detected for posi and nega, respectively.

Ionization method
ESI
Capillary voltage: 3.5 kV
Desolvent gas: 300° C.
Ion source temperature: 120° C.
Detector
posi: 40 V, 200 to 1500 amu/0.9 sec
nega: 40 V, 200 to 1500 amu/0.9 sec.

According to the method and conditions described above, the measurement was conducted on Exemplified Compound I-5, which was a specific example of the first coloring material, Exemplified Compound II-1, which was a specific example of the second coloring material, and Exemplified Compound III-17, which was a specific example of the third coloring material, as representative examples of the respective coloring materials. As a result, the values of the resultant retention time, maximum absorption wavelength, M/Z (posi) and M/Z (nega) are shown in Table 3. When the measurement is conducted on an unknown ink under the same method and conditions as described above, and the resultant respective values correspond to the values shown in Table 3, the ink can be determined to contain a compound corresponding to the compound used in the present invention.

TABLE 3

| | Analysis results | | | |
|---|---|---|---|---|
| Exemplified Compound | Retention time [min] | Maximum absorption wavelength [nm] | M/Z | |
| | | | posi | nega |
| I-5 | 29.0 to 30.0 | 600 to 620 | 1091 to 1094 | 1090 to 1093 |
| II-1 | 30.0 to 31.0 | 410 to 430 | 573 to 576 | 1150 to 1153 |
| III-17 | 31.0 to 32.0 | 550 to 570 | 1079 to 1082 | 1077 to 1080 |

[Content of Coloring Material]

The content of the first coloring material (compound of the general formula (I)), the content of the second coloring material (compound of the general formula (II)) and the content of the third coloring material (compound of the general formula (III)) in the ink are favorably set as described below from the viewpoints of color tone and light fastness.

The content (% by mass) of the first coloring material in the ink with respect to the total content (% by mass) of all the coloring materials in the ink, i.e., [first coloring material/all coloring materials in the ink]×100, is favorably from 45.0% or more to 75.0% or less. If the value [first coloring material/all coloring materials in the ink]×100 is less than 45.0% or exceeds 75.0%, such an ink may not provide an image (initial image) having a gradation property with color tone favorable for black ink.

The content (% by mass) of the second coloring material in the ink with respect to the total content (% by mass) of all the coloring materials in the ink, i.e., [second coloring material/all coloring materials in the ink]×100, is favorably from more than 12.0% to 40.0% or less, more favorably from more than 12.0% to 25.0% or less. If the value [second coloring material/all coloring materials in the ink]×100 is 12.0% or less, such an ink may not provide an image (initial image) having a gradation property with color tone favorable for black ink. If the value [second coloring material/all coloring materials in the ink]×100 exceeds 40.0%, such an ink may not provide an image (after the light fastness test) having a gradation property with color tone favorable for black ink. When the value [second coloring material/all coloring materials in the ink]×100 is from more than 12.0% to 25.0% or less, such an ink can provide an image having a gradation property with color tone more favorable for black ink even initially and after the light fastness test.

The content (% by mass) of the third coloring material in the ink with respect to the total content (% by mass) of all the coloring materials in the ink, i.e., [third coloring material/all coloring materials in the ink]×100, is favorably from 4.0% or more to 40.0% or less, more favorably from 4.0% or more to 25.0% or less. If the value [second coloring material/all coloring materials in the ink]×100 is less than 4.0% or exceeds 40.0%, such an ink may not provide an image (initial image and after the light fastness test) having a gradation property with color tone favorable for black ink. When the value [second coloring material/all coloring materials in the ink]×100 is from 4.0% or more to 25.0% or less, such an ink can provide an image having a gradation property with color tone more favorable for black ink even initially and after the light fastness test.

In the present invention, an ink satisfying the following conditions as to the contents of the respective coloring materials is particularly favorable. First, the content (% by mass) of the first coloring material in the ink is favorably 50.0% or more based on the total content (% by mass) of all the coloring materials in the ink. Then, the content (% by mass) of the second coloring material is favorably 0.60 times or more and less than 1.00 time in terms of mass ratio to the content (% by mass) of the third coloring material. The ink satisfying these two conditions is provided, whereby an image (initial image) having a gradation property can be provided as an image having a more neutral color tone. In this case, the upper limit of the content (% by mass) of the first coloring material in the ink is favorably 75.0% or less based on the total content (% by mass) of all the coloring materials in the ink.

The total content (% by mass) of the first, second and third coloring materials in the ink is favorably 0.1% by mass or more and 15.0% by mass or less based on the total mass of the ink. The total content (% by mass) of these coloring materials is more favorably 0.5% by mass or more and 10.0% by mass or less. If the total content is less than 0.1% by mass, the color developing of the resulting ink may not be sufficiently achieved in some cases. If the total content exceeds 15.0% by mass, the ink jet properties such as sticking resistance may not be achieved in some cases.

Incidentally, the color tone favorable for black ink, i.e., the color tone that is neutral and provides a favorable image, in the present invention specifically means the following. With respect to an image having a gradation property formed with a black ink by gradually lowering the recording duty from 100%, $a^*$ and $b^*$ in the $L^*a^*b^*$ color space prescribed by CIE (International Commission on Illumination) are measured. When the values of $a^*$ and $b^*$ in at least a portion where the recording duty is 100% are $-5 \leq a^* \leq 5$ and $-5 \leq b^* \leq 5$, respectively, such an ink is defined as an ink having a color tone favorable for black ink in the present invention. An ink satisfying the following provisions is defined as an ink having a color tone more favorable for black ink. Namely, it is favorable that the values of $a^*$ and $b^*$ in the portion where the recording duty is 100% are $-5 \leq a^* \leq 5$ and $-5 \leq b^* \leq 5$, respectively, and the values of $a^*$ and $b^*$ for each gradation formed by lowering the recording duty are $-10 \leq a^* \leq 10$ and $-10 \leq b^* \leq 10$, respectively. Incidentally, values of $a^*$ and $b^*$ can be measured by means of, for example, a spectrophotometer (trade name: Spectrolino; manufactured by Gretag Macbeth Co.). Needless to say, the present invention is not limited thereto.

(Aqueous Medium)

An aqueous solvent that is water or a mixed solvent of water and a water-soluble organic solvent may be used in the ink according to the present invention. Deionized water (ion-exchanged water) is favorably used as the water. The content (% by mass) of water in the ink is favorably 10.0% by mass or more and 90.0% by mass or less based on the total mass of the ink.

No particular limitation is imposed on the water-soluble organic solvent so far as the solvent is soluble in water, and alcohols, polyhydric alcohols, polyglycols, glycol ethers, nitrogen-containing polar solvents and sulfur-containing polar solvents may be used. The content (% by mass) of the water-soluble organic solvent in the ink is favorably 5.0% by mass or more and 90.0% by mass or less, more favorably 10.0% by mass and more to 50.0% by mass or less based on the total mass of the ink. If the content of the water-soluble organic solvent is less than the above range, reliability such as ejection stability may not be achieved in some cases when the resulting ink is used in an ink jet recording apparatus. If the content of the water-soluble organic solvent is more than the above range, the viscosity of the resulting ink may increase in some cases to cause feeding failure of the ink.

Specific examples of usable water-soluble organic solvents include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; glycols such as ethylene glycol, propylene glycol, butylene glycol, diethylene glycol, triethylene glycol, hexylene glycol and thiodiglycol; alkylene glycols the alkylene group of which has 2 to 6 carbon atoms, such as 1,5-pentanediol, 1,6-hexanediol, 2-methyl-1,3-propanediol, 3-methyl-1,5-pentanediol and 1,2,6-hexanetriol; bis(2-hydroxyethyl)-sulfone; lower alkyl ether acetates such as polyethylene glycol monomethyl ether acetate; alkyl ethers of polyhydric alcohols, such as ethylene glycol monomethyl (or ethyl) ether, diethylene glycol methyl (or ethyl)ether and triethylene glycol monomethyl (or ethyl)ether; N-methyl-2-pyrrolidone; 2-pyrrolidone; and 1,3-dimethyl-2-imidazolidinone. Needless to say, the present invention is not limited these solvents. One or more of these water-soluble organic solvents may be used as needed.

(Other Additives)

The ink according to the present invention may contain water-soluble organic compounds being solid at ordinary temperature, such as polyhydric alcohols such as trimethylolpropane and trimethylolethane, and urea derivatives such as ethyleneurea in addition to the above-described components as needed. In addition, the ink according to the present invention may contain various additives such as surfactants, pH adjustors, rust preventives, preservatives, mildewproofing agents, antioxidants, anti-reducing agents, evaporation accelerators, chelating agents and water-soluble polymers as needed.

(Other Inks)

In order to form a full-color image, the ink according to the present invention may be used in combination with inks having another color tone than the ink according to the present invention. The ink according to the present invention is favorably used in combination with at least one ink selected from, for example, black, cyan, magenta, yellow, red, green and blue inks. The so-called light color inks respectively having substantially the same color tones as those inks may also be further used in combination. Coloring materials used in these inks or light color inks may be publicly known dyes or newly synthesized coloring materials.

<Recording Medium>

As a recording medium used upon forming an image with the ink according to the present invention, any recording medium may be used so far as the ink can be applied thereto to conduct recording. In the present invention, a recording medium for ink jet with which a coloring material such as a dye or pigment is caused to be adsorbed on fine particles forming a porous structure of an ink-receiving layer is favorably used. In particular, a recording medium having the so-called interstice-absorbed type ink-receiving layer with which an ink is absorbed in interstices formed in an ink-receiving layer on a base material is favorably used. The interstice-absorbed type ink-receiving layer is formed by mainly using fine particles and may contain a binder and other additives as needed.

Specific examples of usable fine particles include inorganic pigments such as silica, clay, talc, calcium carbonate, kaolin, aluminum oxides such as alumina and alumina hydrate, diatomaceous earth, titanium oxide, hydrotalcite, and zinc oxide; and organic pigments such as urea-formalin resins, ethylene resins and styrene resins. One or more kinds of these fine particles may be used as needed.

As the binder, may be used a water-soluble polymer or latex. Specific examples of usable binders include polyvinyl alcohol, starch and gelatin, and modified products thereof, gum arabic, cellulose derivatives such as carboxymethyl cellulose, hydroxyethyl cellulose and hydroxypropionylmethyl cellulose, SBR latexes, NBR latexes, methyl methacrylate-butadiene copolymer latexes, functional-group-modified polymer latexes, vinyl copolymer latexes such as ethylene-vinyl acetate copolymers, polyvinyl pyrrolidone, maleic anhydride polymers or copolymers thereof, and acrylic ester copolymers. One or more of these binders may be used as needed.

In addition, additives may be used as needed. Examples of usable additive include a dispersing agent, thickener, pH adjuster, lubricant, flowability modifier, surfactant, antifoaming agent, parting agent, fluorescent whitening agent, ultraviolet absorbent, antioxidant and dye fixer.

When an image is formed with the ink according to the present invention, a recording medium with an ink-receiving layer formed mainly of fine particles having an average particle size of 1 µm or less is favorably used. Specific examples of the fine particles include fine silica particles and fine aluminum oxide particles. As the fine silica particles, fine silica particles typified by colloidal silica are favorable. A commercially available product may also be used as the colloidal silica. However, colloidal silica described in, for example, Japanese Patent Registration Nos. 2803134 and 2881847 is favorably used. As favorable examples of the fine aluminum oxide particles, may be mentioned fine alumina hydrate particles (alumina pigments).

Among the alumina pigments, alumina hydrates such as pseudoboehmite represented by the formula are favorably used.

$$AlO_{3-n}(OH)_{2n} \cdot mH_2O$$

wherein n is an integer of 1 to 3, and m is a number of 0 to 10, favorably 0 to 5, with the proviso that m and n are not 0 at the same time.

In many cases, $mH_2O$ represents an aqueous phase which does not participate in the formation of a crystal lattice, but can be eliminated. Therefore, m may take a value other than an integer. When this kind of alumina hydrate is heated, m may reach a value of 0.

The alumina hydrate can be prepared according to such a publicly known process as described below. For example, the alumina hydrate can be prepared by hydrolysis of an aluminum alkoxide or sodium aluminate as described in U.S. Pat. Nos. 4,242,271 and 4,202,870. The alumina hydrate can also be prepared by a process in which an aqueous solution of sodium sulfate or aluminum chloride is added to an aqueous solution of sodium aluminate to conduct neutralization as described in Japanese Patent Publication No. 57-44605.

The recording medium favorably has a base material for supporting the ink-receiving layer. No particular limitation is imposed on the base material so far as an ink-receiving layer can be formed on the base material by the porous fine particles, and a stiffness sufficient for conveyance by a conveying mechanism such as a ink jet recording apparatus can be obtained, and any base material may be used. For example, a paper base material formed of a pulp material composed mainly of natural cellulose fibers may be used. A plastic base material formed of a material such as polyester (for example, polyethylene terephthalate), cellulose triacetate, polycarbonate, polyvinyl chloride, polypropylene or polyimide may also be used. Further, resin-coated paper (for example, RC paper) having a polyolefin resin coated layer, to which a white pigment is added, on at least one surface of a paper substrate may be used.

<Ink Jet Recording Method>

The ink according to the present invention is used in an ink jet recording method that an ink is ejected by an ink jet recording system to conduct recording on a recording medium. Examples of the ink jet recording method include a recording method in which mechanical energy is applied to an ink to eject the ink, and a recording method in which thermal energy is applied to an ink to eject the ink. In the present invention, the ink jet recording method utilizing thermal energy may be favorably used.

<Ink Cartridge>

An ink cartridge suitable for conducting recording with the ink according to the present invention includes an ink cartridge according to the present invention equipped with an ink storage portion storing such an ink.

<Recording Unit>

A recording unit suitable for conducting recording with the ink according to the present invention includes a recording unit according to the present invention equipped with an ink storage portion storing such an ink and a recording head for ejecting the ink. A recording unit of which the recording head ejects an ink by applying thermal energy corresponding to a recording signal to the ink may favorably be used. In particular, a recording head having a liquid-contacting face of a heat-generating portion containing a metal and/or a metal oxide is favorably used. Specific examples of the metal and/or the metal oxide making up the liquid-contacting face of the heat-generating portion include metals such as Ta, Zr, Ti, Ni and Al, and oxides of these metals.

<Ink Jet Recording Apparatus>

An ink jet recording apparatus suitable for conducting recording with the ink according to the present invention includes an ink jet recording apparatus according to the present invention equipped with an ink storage portion storing such an ink and a recording head for ejecting the ink. In particular, an ink jet recording apparatus with which an ink is ejected by applying thermal energy corresponding to a recording signal to the ink in the interior of the recording head having the ink storage portion storing the ink is mentioned.

The schematic construction of a mechanism portion of the ink jet recording apparatus will hereinafter be described. The ink jet recording apparatus is constructed, in terms of role of mechanisms, by a paper feeding portion, a conveying portion, a carriage portion, a paper discharging portion, a cleaning portion and an outer facing portion for protecting these portions and imparting design feature.

Figure 2:
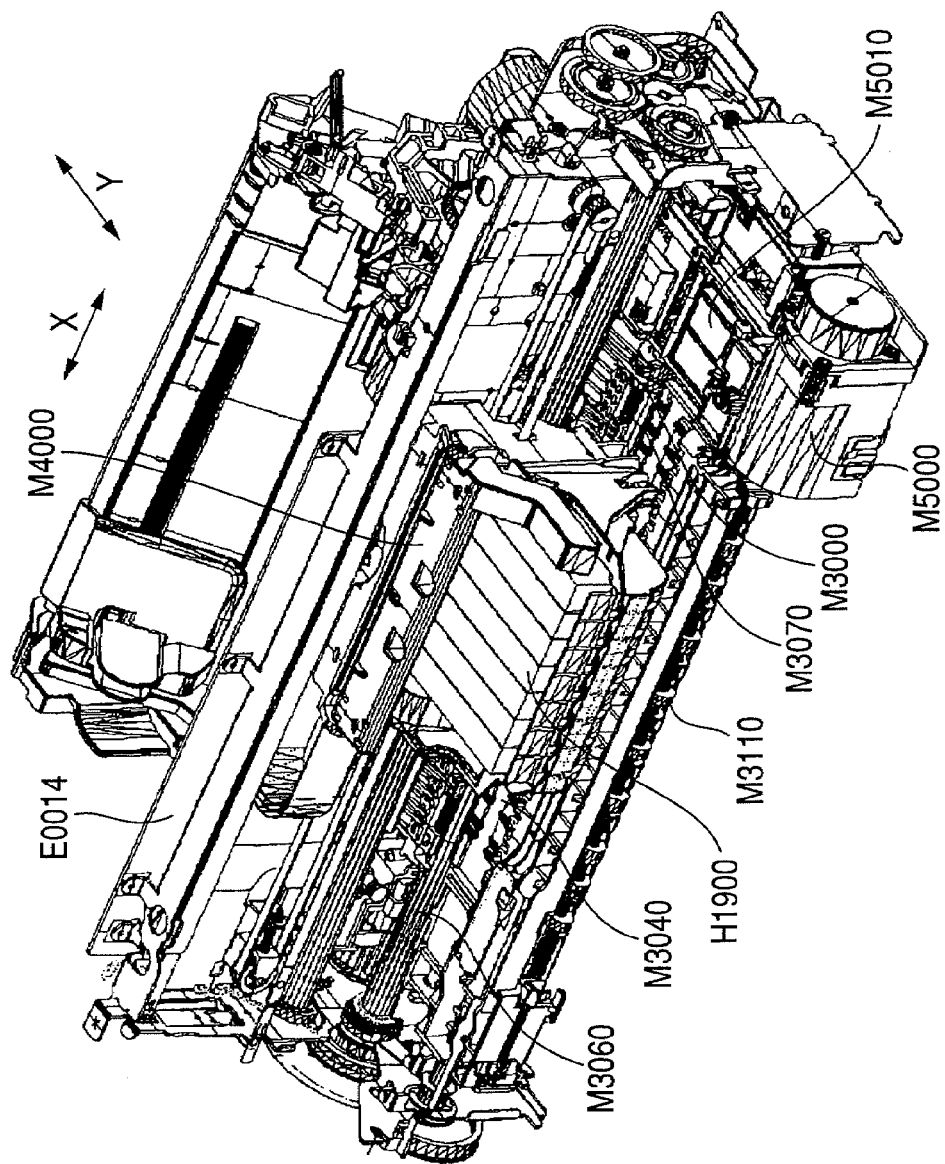
FIG. 2 is a perspective view of a mechanism part of the ink jet recording apparatus.
Figure 3:
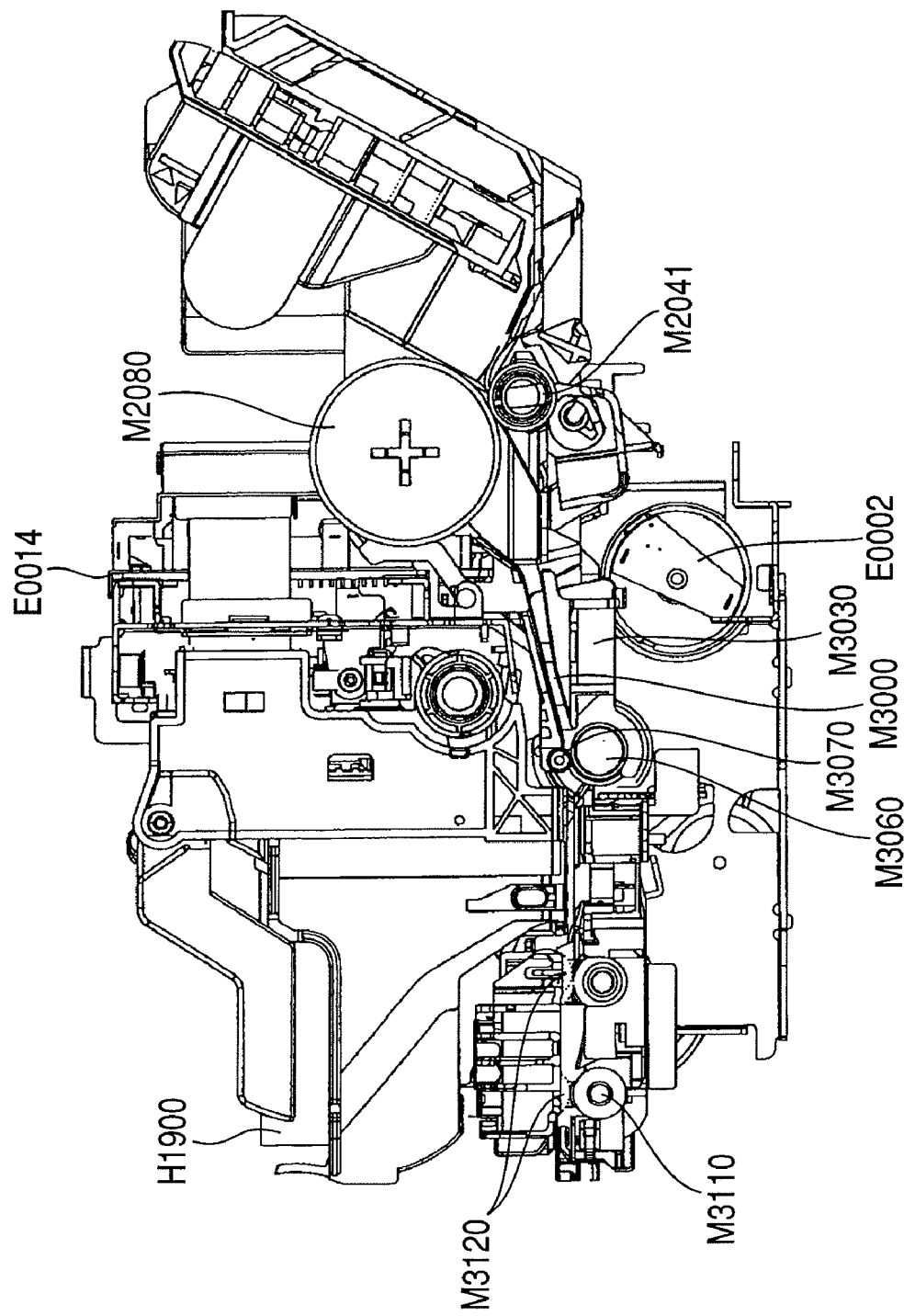
FIG. 3 is a sectional view of the ink jet recording apparatus.

FIG. 1 is a perspective view of the ink jet recording apparatus. FIGS. 2 and 3 are drawings illustrating the internal mechanism of the ink jet recording apparatus, in which FIG. 2 is a perspective view from the top right-hand, and FIG. 3 is a sectional side elevation of the ink jet recording apparatus.

Upon feeding of paper, only a predetermined number of recording media is sent to a nip portion constructed by a paper feed roller M2080 and a separating roller M2041 in the paper feeding portion including a paper feeding tray M2060. The recording media are separated in the nip part, and only a recording medium located uppermost is conveyed. The recording medium sent to the conveying portion is guided to a pinch roller holder M3000 and a paper guide flapper M3030 and sent to a pair of rollers of a conveying roller M3060 and a pinch roller M3070. The pair of rollers having the conveying roller M3060 and the pinch roller M3070 are rotated by driving of an LF motor E0002, and the recording medium is conveyed on a platen M3040 by this rotation.

Upon forming of an image on the recording medium, a recording head H1001 (FIG. 4; detailed construction will be described subsequently) is arranged at an intended image forming position in the carriage portion, and an ink is ejected on the recording medium according to a signal from an electric substrate E0014. While conducting recording by the recording head H1001, a main scanning in which a carriage M4000 scans in a columnar direction and a secondary scanning in which the conveying roller M3060 conveys the recording medium in a row direction are alternately repeated, thereby forming an image on the recording medium. The recording medium, on which the image has been formed, is nipped and conveyed between a first paper discharging roller M3110 and a spur M3120 in the paper discharging portion and discharged on a paper discharging tray M3160.

In the cleaning portion, the recording head H1001 before and after the recording is cleaned. A pump M5000 is operated with the ejection orifices of the recording head H1001 being capped with a cap M5010, whereby an unnecessary ink is sucked from the ejection orifices of the recording head H1001. When the ink remaining in the cap M5010 is sucked with the cap being opened, sticking of the remaining ink or other troubles are prevented.

(Construction of Recording Head)

Figure 4:
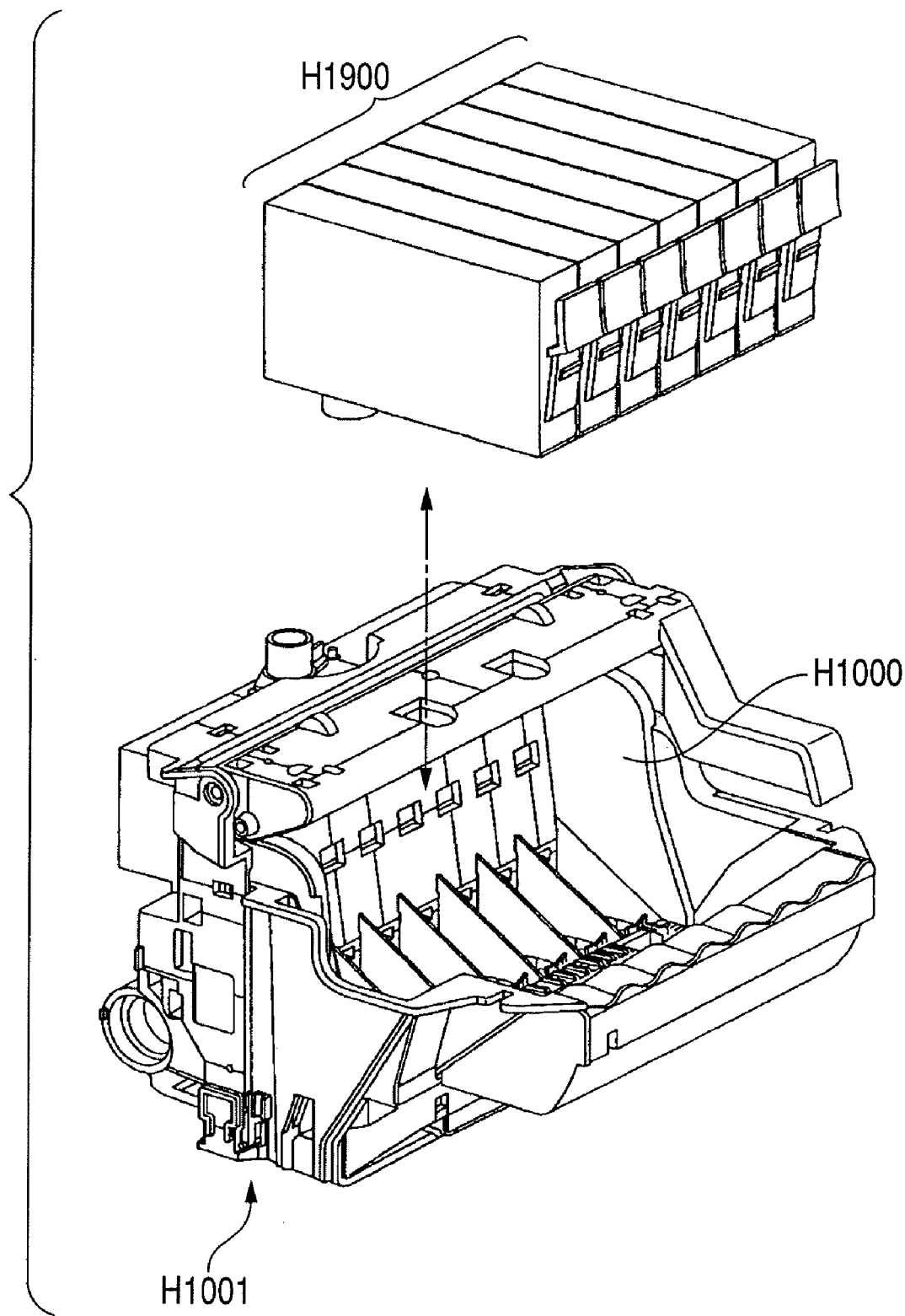
FIG. 4 is a perspective view illustrating a state that an ink cartridge is installed in a head cartridge.

The construction of a head cartridge H1000 will be described. FIG. 4 illustrates the construction of the head cartridge H1000 and a manner of installing an ink cartridge H1900 in the head cartridge H1000. The head cartridge H1000 has a recording head H1001, a unit for installing the ink cartridge H1900 and a unit for feeding an ink from the ink cartridge H1900 to the recording head. The head cartridge H1000 is detachably installed on the carriage M4000.

The ink jet recording apparatus forms an image with respective inks of yellow, magenta, cyan, black, light magenta, light cyan and green. Accordingly, ink cartridges H1900 for 7 colors are independently provided. The ink according to the present invention is used as at least one ink of the inks described above. As illustrated in FIG. 4, each ink cartridge H1900 is detachably installed in the head cartridge H1000. The ink cartridge H1900 can be detached or installed with the head cartridge H1000 being installed in the carriage M4000.

Figure 5:
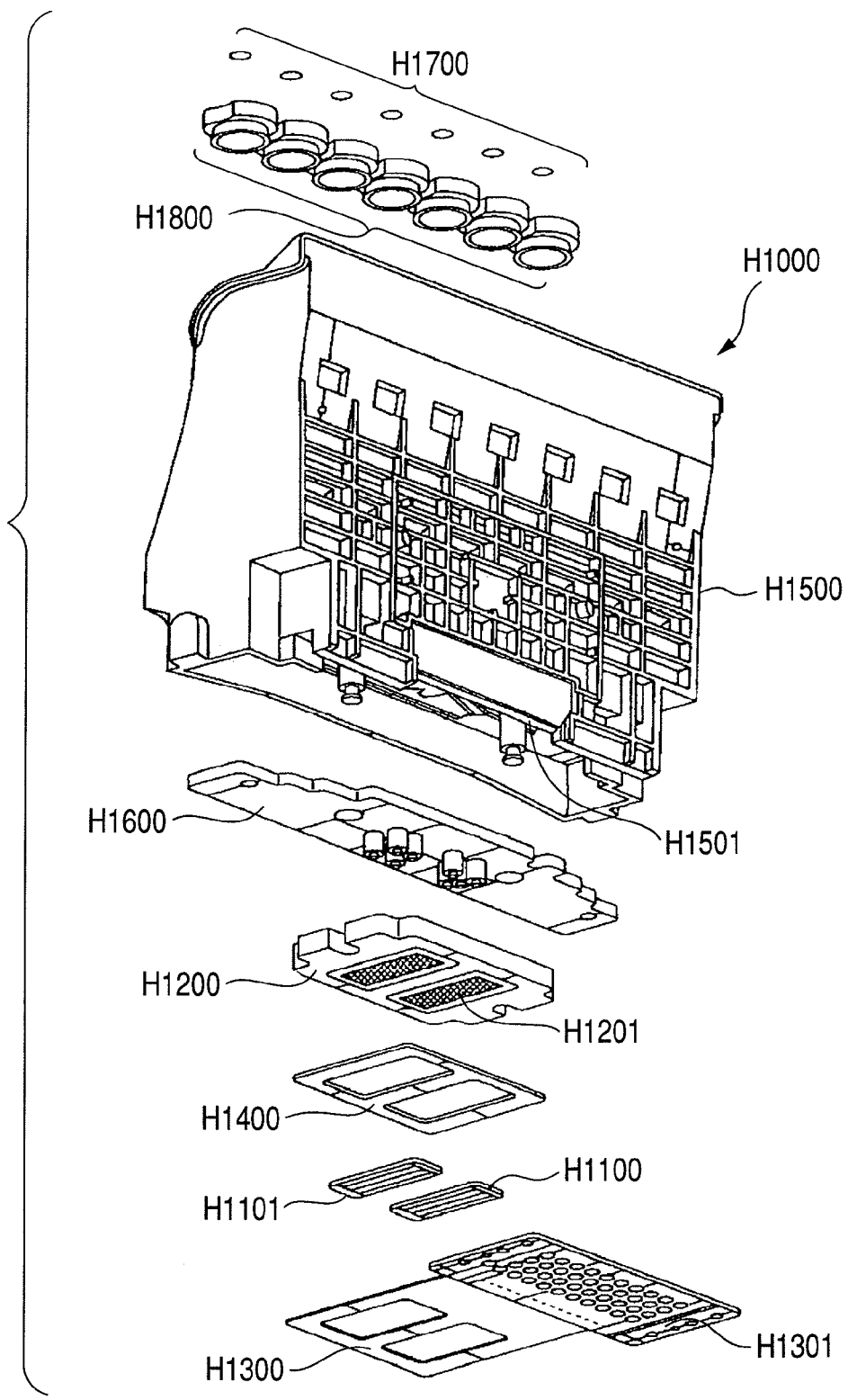
FIG. 5 is an exploded perspective view of the head cartridge.

FIG. 5 is an exploded perspective view of the head cartridge H1000. The head cartridge H1000 is constructed by recording element substrates, plates, an electric wiring substrate H1300, a cartridge holder H1500, a flow path forming member H1600, filters H1700 and seal rubber H1800. The recording element substrates include a first recording element substrate H1100 and a second recording element substrate H1101, and the plates include a first plate H1200 and a second plate H1400.

The first recording element substrate H1100 and the second recording element substrate H1101 are Si substrates, and a plurality of recording elements (nozzles) for ejecting an ink is formed in one surfaces thereof by a photolithographic technique. An electric wiring such as Al for supplying electric power to each recording element is formed by a film forming technique. A plurality of ink flow paths corresponding to the individual recording elements is also formed by the photolithographic technique. Ink supply openings for supplying inks to a plurality of the ink flow paths are formed so as to open to a back surface.

Figure 6:
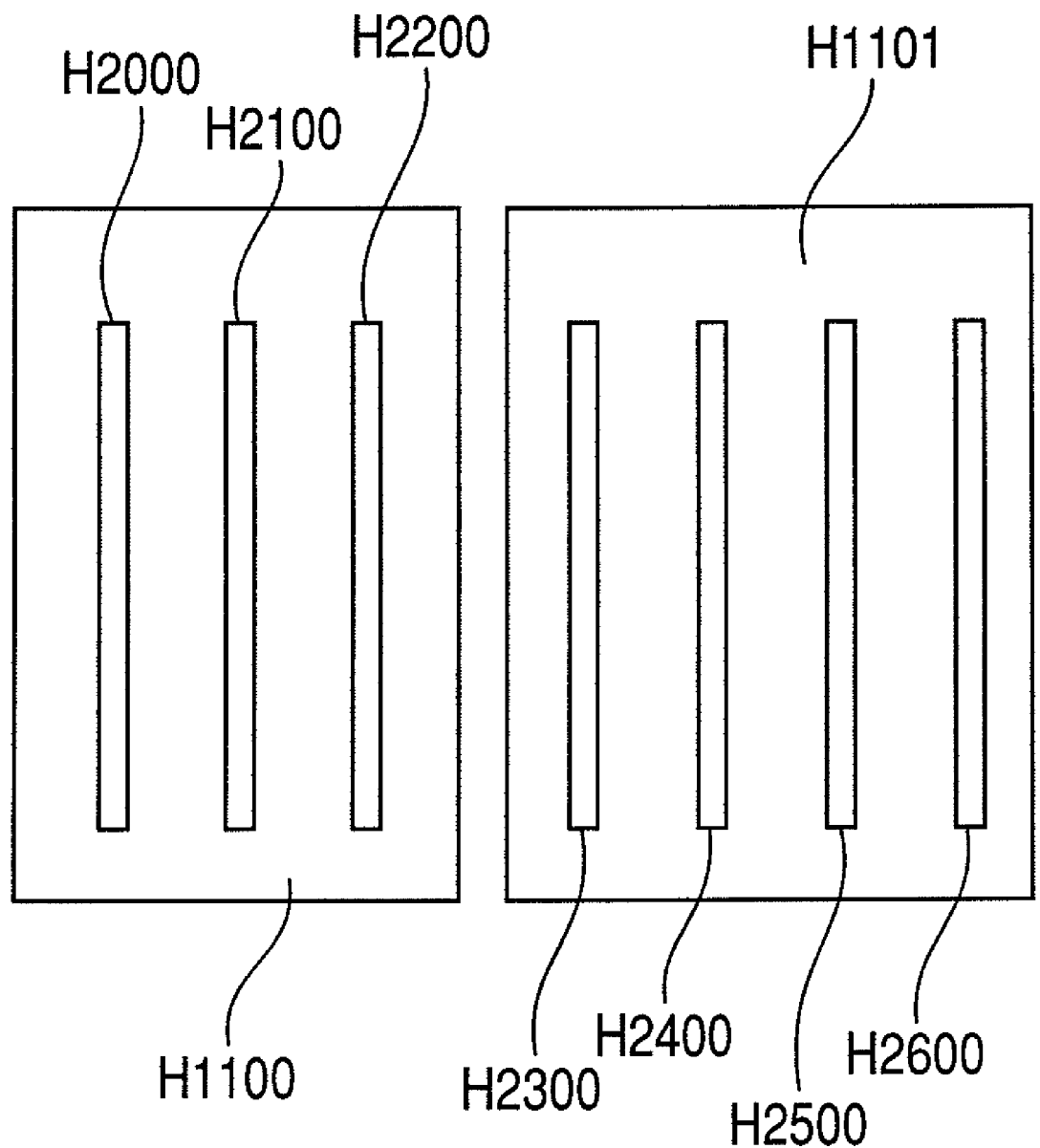
FIG. 6 is an elevational view illustrating recording element substrates in the head cartridge.

FIG. 6 is an enlarged elevational view illustrating the constructions of the first recording element substrate H1100 and the second recording element substrate H1101. Rows H2000 to H2600 (hereinafter also referred to as nozzle rows) of recording elements for respectively supplying different inks are formed in the substrates. In the first recording element substrate H1100, are formed nozzle rows for 3 colors of a nozzle row H2000 for the yellow ink, a nozzle row H2100 for the magenta ink and a nozzle row H2200 for the cyan ink. In the second recording element substrate H1101, are formed nozzle rows for 4 colors of a nozzle row H2300 for the light cyan ink, a nozzle row H2400 for the black ink, a nozzle row H2500 for the green ink and a nozzle row H2600 for the light magenta ink.

Each nozzle row has 768 nozzles arranged at intervals of 1,200 dpi (dots/inch; referential value) and ejects about 2 picoliters of an ink. The opening area in each ejection orifice is set to about 100 $\mu m^2$.

Description is given with reference to FIGS. 4 and 5. The first recording element substrate H1100 and second recording element substrate H1101 are bonded and fixed to the first plate H1200. In the first plate, are formed ink supply openings H1201 for supplying inks to the first recording element substrate H1100 and second recording element substrate H1101. Further, the second plate H1400 having openings is bonded and fixed to the first plate H1200. This second plate H1400 holds the electric wiring substrate H1300 so as to electrically connect the electric wiring substrate H1300 to the first recording element substrate H1100 and second recording element substrate H1101.

The electric wiring substrate H1300 applies an electric signal for ejecting an ink from each nozzle formed in the first recording element substrate H1100 and second recording element substrate H1101. The electric wiring substrate H1300 has electric wirings corresponding to the first recording element substrate H1100 and second recording element substrate H1101, and an external signal input terminal H1301 located at edges of the electric wirings for receiving electric signals from the ink jet recording apparatus. The external signal input terminal H1301 is positioned and fixed on the back surface side of the cartridge holder H1500.

The flow path forming member H1600 is fixed to the cartridge holder H1500 for holding the ink cartridges H1900 by, for example, ultrasonic welding to form ink flow paths H1501 linking from the ink cartridges H1900 to the first plate H1200. The filters H1700 are provided at ends on the ink cartridge side of the ink flow paths H1501 linking to the ink cartridges H1900 so as to prevent invasion of dust from the outside. Sealing rubbers H1800 are fitted to portions engaged with the ink cartridges H1900 so as to prevent evaporation of the inks from the engaged portions.

A cartridge holder portion is bonded to a recording head portion H1001 by, for example, adhesion, thereby forming the head cartridge H1000. The cartridge holder portion includes the cartridge holder H1500, the flow path forming member H1600, the filters H1700 and the sealing rubber H1800. The recording head portion H1001 includes the first recording element substrate H1100, the second recording element substrate H1101, the first plate H1200, the electric wiring substrate H1300 and the second plate H1400.

The recording head of the thermal ink jet system that recording is conducted using electrothermal converters (recording elements), which generate thermal energy for causing an ink to cause film boiling corresponding to an electric signal, has been described as an embodiment of the recording head herein. Typical construction and principle thereof are those which perform recording by using fundamental principles as disclosed in, for example, U.S. Pat. No. 4,723,129 and U.S. Pat. No. 4,740,796. This system is applicable to any of what are called an On-Demand type and a continuous type.

In particular, the thermal ink jet system is effectively applied to the On-Demand type. In the case of the On-Demand type, at least one driving signal, which corresponds to recording information and gives a rapid temperature rise exceeding nuclear boiling, is applied to an electrothermal converter arranged corresponding to a liquid flow path, in which an ink is retained, thereby causing the electrothermal converter to generate thermal energy to cause film boiling in the ink. As a result, a bubble can be formed in the ink in response to the driving signal in relation of one to one. The ink is ejected through an ejection orifice by the growth-contraction of this bubble to form at least one droplet. When the driving signal is applied in the form of a pulse, the growth-contraction of the bubble is suitably conducted in a moment, so that the ejection of the ink excellent in responsiveness in particular can be achieved. It is therefore favorable to use such pulsed signals.

The ink according to the present invention may also be favorably used in an ink jet recording apparatus utilizing mechanical energy as will be described below, not limited to the above-described thermal ink jet system. The ink jet recording apparatus of this system includes a nozzle-forming substrate having a plurality of nozzles, pressure-generating elements having a piezoelectric material and an electrically conductive material provided in an opposing relation to the nozzles, and an ink filled around the pressure-generating elements, in which the pressure-generating elements are displaced by voltage applied to eject the ink from the nozzles.

The ink jet recording apparatus are not limited to the apparatus as described above in which the head and the ink cartridge are separately provided. Therefore, a device in which these members are integrally formed may also be used. The ink cartridge may be separably or unseparably and integrally installed in a recording head and mounted on a carriage, or may be provided at a fixing site of an ink jet recording apparatus to supply an ink to a recording head through an ink supply member such as a tube. When a mechanism for applying a favorable negative pressure to a recording head is provided in an ink cartridge, the following mechanisms may favorably be used. More specifically, examples thereof include a mechanism in which an absorbing member is arranged in an ink storage portion of the ink cartridge, and a mechanism having a flexible ink-storing bag and a spring part for applying biasing force to the bag in a direction to expand the internal volume of the bag. The ink jet recording apparatus may use a recording system of such serial type as described above, or a line printer type in which recording elements are arranged over a range corresponding to the overall width of a recording medium.

EXAMPLES

The present invention will hereinafter be described in more detail by the following Examples and Comparative Examples. However, the present invention is not limited to the following examples unless going beyond the gist of the present invention. Incidentally, parts of ink components in Examples and Comparative Examples mean "parts by mass" unless expressly noted.

<Preparation of Coloring Material>

Exemplified Compounds were prepared according to the following procedure. With respect to each of the Exemplified Compounds thus obtained, a maximum absorption wavelength ($\lambda_{max}$) in an absorption spectrum was measured by using water as a solvent under the following conditions.

Spectrophotometer: automatic recording spectrophotometer (trade name: U-3300, manufactured by Hitachi Ltd.)
Measuring cell: 1-cm quartz cell
Sampling interval: 0.1 nm
Scanning speed: 30 nm/min.

(Syntheses of Exemplified Compounds I-3 and I-5, and Measurement of Property Values)

Exemplified Compounds I-3 (M: lithium) and Exemplified Compounds I-5 (M: lithium) as described above were synthesized as the description of Japanese Patent Application Laid-Open No. 2005-139427. These exemplified compounds correspond to those obtained by converting the dyes b-6 and c-4 described in the application into lithium salts thereof. Maximum absorption wavelengths ($\lambda_{max}$) in an absorption spectrum measured by using water as a solvent were 608 nm for Exemplified Compound I-3 and 604 nm for Exemplified Compound I-5.

(Syntheses of Exemplified Compounds II-1 and II-9, and Measurement of Property Values)

As Exemplified Compounds II-1 (M: sodium) and Exemplified Compounds II-9 (M: sodium) as described above were synthesized as the description of International Publication No. WO2006/001274 Pamphlet. These exemplified compounds correspond to those obtained by converting the dyes synthesized in Examples 1 and 2 described in the pamphlet into sodium salts thereof. Maximum absorption wavelengths ($\lambda_{max}$) in an absorption spectrum measured by using water as a solvent were 414 nm for Exemplified Compound II-1 and 436 nm for Exemplified Compound II-9.

(Synthesis of Exemplified Compounds III-6, and Measurement of Property Value)

Exemplified Compound III-6 (M: sodium) described above was synthesized according to the following procedure.

(1) Synthesis of Compound of Formula (9):

In 100 parts of water, was dissolved 21.7 parts of 5-sulfoanthranilic acid with the pH adjusted to 5.0 to 6.0 by adding sodium hydroxide. After 31.3 parts of 35% hydrochloric acid was added to the solution, the temperature of the liquid mixture was controlled at 0 to 5° C., and 19.0 parts of a 40% aqueous solution of sodium nitrite was added to conduct diazotization. A solution obtained by dissolving 24.0 parts of a compound of the following formula (8) obtained by the process described in Japanese Patent Application Laid-Open No. 2004-083492 in 240 parts of water with the pH adjusted to 4.5 to 5.5 by adding sodium hydroxide was added dropwise to this diazo solution over about 20 minutes. Thereafter, the temperature of the resultant liquid mixture was controlled at 10 to 20° C., and the pH of the mixture was adjusted to 2.0 to 3.0 by adding sodium carbonate. The mixture was stirred for 3 hours while keeping this temperature and pH. Sodium chloride was then added to conduct salting out, and the deposit was separated by filtration and dried to obtain 42.1 parts of a compound of the following formula (9).

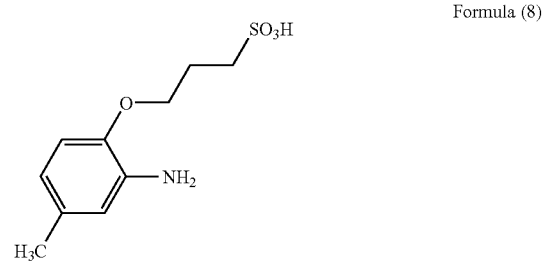

Formula (8)

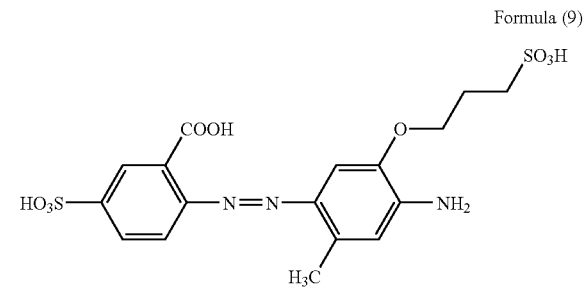

Formula (9)

(2) Synthesis of Compound of Formula (10):

In 40 parts of water, was suspended 7.1 parts of the compound of the formula (9) obtained above, and the pH of the suspension was adjusted to 4.0 to 5.0 by adding sodium hydroxide to obtain a solution. After 6.0 parts of 35% hydrochloric acid was added to this solution, the temperature of the resultant liquid mixture was controlled at 15 to 25° C., and 2.9 parts of a 40% aqueous solution of sodium nitrite was added to conduct diazotization. This diazo solution was added dropwise to a solution obtained by dissolving 3.6 parts of a compound of the above formula (8) in 30 parts of water with the pH adjusted to 4.5 to 5.5 by adding sodium hydroxide over about 30 minutes. During the drop addition, the pH of the solution was kept at 3.5 to 4.5 by adding sodium carbonate. Thereafter, the mixture was stirred for 2 hours, and sodium chloride was added to conduct salting out. The deposit was separated by filtration to obtain a wet cake containing a dis-azo compound of the following formula (10).

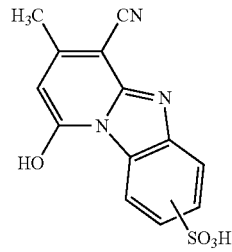

Formula (12)

(4) Synthesis of Exemplified Compound III-6:

The wet cake containing the dis-azo compound of the formula (10) obtained in the process (2) was dissolved in 80 parts of water with the pH adjusted to 6.0 to 7.0 by adding sodium hydroxide, and 2.3 parts of a 40% aqueous solution of sodium nitrite was added to this solution. Thereafter, this solution was added dropwise to a liquid mixture of 5.2 parts of 35% hydrochloric acid and 70 parts of water at a temperature of 20 to 30° C. to conduct diazotization. This diazo suspension was added dropwise at a temperature of 20 to 30° C. to a solution obtained by dissolving 3.0 parts of the compound of the formula (12) obtained in the process (3) in 50 parts of water with the pH adjusted to 8.0 to 9.0. During the drop addition, the pH of the solution was kept at 7.0 to 8.0 by adding sodium carbonate. Thereafter, the mixture was stirred for 2 hours at the same temperature, sodium chloride was added to conduct salting out, and the deposit was separated by filtration. After the resultant wet cake was dissolved in 50 parts of water, 120 parts of methanol was added to conduct crystallization, and the deposit was separated by filtration. After the resultant wet cake was further dissolved in 50 parts of water, 120 parts of methanol was added to conduct crystallization, and the deposit was dried to obtain Exemplified Compound III-6 (sodium salt) of the following structure. Maximum absorption wavelength ($\lambda_{max}$) in an absorption spectrum measured by using water as a solvent was 553 nm for Exemplified Compound III-6.

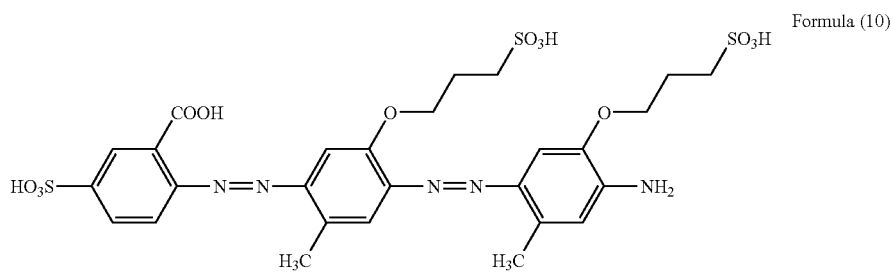

Formula (10)

(3) Synthesis of Compound of Formula (12):

2-(cyanomethyl)benzimidazole and ethyl acetoacetate were heated and reacted in the presence of sodium methoxide in ethanol. After 8.9 parts of a compound of the following formula (11) obtained through acidifying out by adding dilute hydrochloric acid to this reaction product was slowly added to 64 parts of 6% fuming sulfuric acid at a temperature of 15 to 25° C., the resultant liquid mixture was stirred for 2 hours at the same temperature, and the resultant liquid was then added dropwise to 190 parts of ice water over about 10 minutes. Deposited crystals were separated by filtration and dried to obtain a compound of the following formula (12).

Formula (11)

Exemplified compound III-6

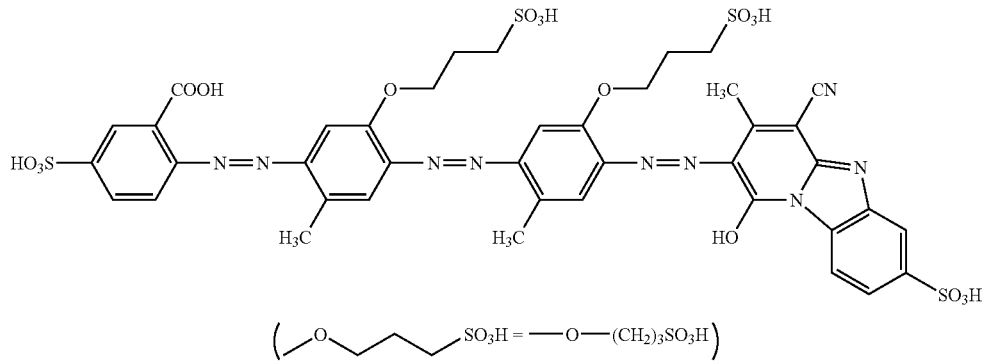

(Synthesis of Exemplified Compound III-17, and Measurement of Property Value)

Exemplified Compound III-17 (M: sodium) described above was synthesized according to the following procedure.

(1) Synthesis of Compound of Formula (13):

A compound of the following formula (13) was obtained in the same manner as in the process (1) of Exemplified Compound III-6 except that 25.3 parts of 2-aminobenzene-1,5-disulfonic acid was used in place of 21.7 parts of 5-sulfoanthranilic acid in the process (1) of Exemplified Compound III-6.

(2) to (4) Synthesis of Exemplified Compound III-17:

Exemplified Compound III-17 described above was obtained in the same manner as in the processes (2) to (4) of Exemplified Compound III-6 except that 7.6 parts of the compound of the formula (13) was used in place of 7.1 parts of the compound of the above formula (9) in the process (2) above of Exemplified Compound III-6 (sodium salt) of the following structure. Maximum absorption wavelength ($\lambda_{max}$) in an absorption spectrum measured by using water as a solvent was 557.5 nm for the Exemplified Compound III-17.

Exemplified compound III-17

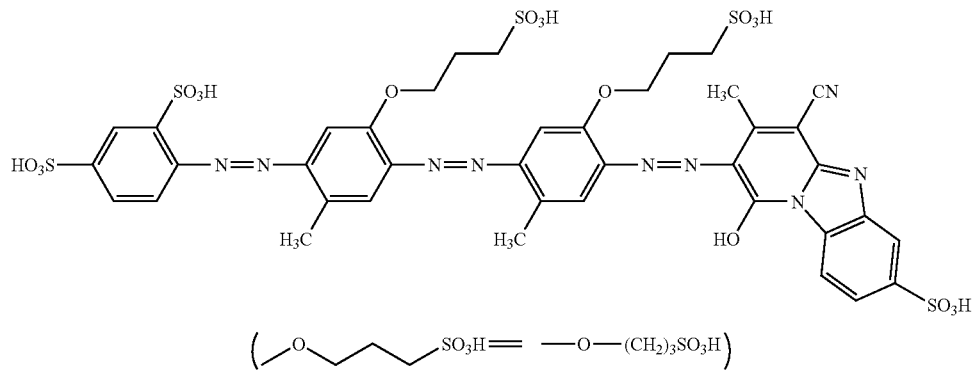

Formula (13)

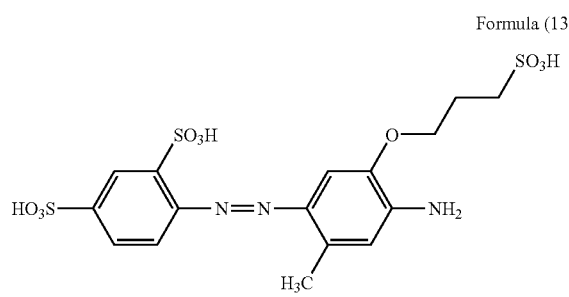

<Preparation of Inks>

Exemplified Compounds I-3, I-5, II-1, II-9, III-6 and III-7 that were coloring materials obtained above, and C.I. Direct Red 84 (sodium salt; coloring material of Comparative Example) were used to respectively prepare inks in the following manner. First, the components shown in Table 4 to Table 6 were mixed and sufficiently stirred. The resultant respective mixtures were then filtered under pressure through a filter having a pore size of 0.2 μm to prepare black inks of Examples 1 to 17 and Comparative Examples 1 to 8. In Table 4 to Table 6, the content of each coloring material and the total content of the coloring materials are values based on the total mass of each ink. The value [each coloring material/all coloring materials]×100 [%] is the proportion [%] of the content of each coloring material to the total content of all the coloring materials. The value [second coloring material/third coloring material] [times] is the mass ratio [times] of the content of the second coloring material to the content of the third coloring material.

TABLE 4

Compositions of Inks of Examples (unit for components shown in upper column: parts by mass)

| | Example | | | | | | | | |
|---|---|---|---|---|---|---|---|---|---|
| | 1 | 2 | 3 | 4 | 5 | 6 | 7 | 8 | 9 |
| Exemplified Compound I-3 (M: lithium) | 3.75 | | | 2.75 | | 3.25 | | | |
| Exemplified Compound I-5 (M: lithium) | | 3.75 | 3.75 | | 2.75 | | 3.25 | 3.00 | 3.05 |
| Exemplified Compound II-1 (M: sodium) | 0.75 | | 0.75 | | 1.00 | 0.75 | 0.75 | 0.75 | 0.95 |
| Exemplified Compound II-9 (M: sodium) | | 0.75 | | 1.00 | | | | | |
| Exemplified Compound III-6 (sodium salt) | 0.50 | | | 1.25 | 1.25 | 1.00 | | | |
| Exemplified Compound II-17 (sodium salt) | | 0.50 | 0.50 | | | | 1.00 | 1.25 | 1.00 |
| C.I. Direct Red 84 | | | | | | | | | |
| Ethylene glycol | 9.00 | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 | 1.00 | 1.00 |
| Pure water | 76.0 | 76.0 | 76.0 | 76.0 | 76.0 | 76.0 | 76.0 | 76.0 | 76.0 |
| Content of first coloring material [%] | 3.75 | 3.75 | 3.75 | 2.75 | 2.75 | 3.25 | 3.25 | 3.00 | 3.05 |
| Content of second coloring material [%] | 0.75 | 0.75 | 0.75 | 1.00 | 1.00 | 0.75 | 0.75 | 0.75 | 0.95 |
| Content of third coloring material [%] | 0.50 | 0.50 | 0.50 | 1.25 | 1.25 | 1.00 | 1.00 | 1.25 | 1.00 |
| Total content of coloring materials [%] | 5.00 | 5.00 | 5.00 | 5.00 | 5.00 | 5.00 | 5.00 | 5.00 | 5.00 |
| First coloring material/ all coloring materials × 100 [%] | 75.0 | 75.0 | 75.0 | 55.0 | 55.0 | 65.0 | 65.0 | 60.0 | 61.0 |
| Second coloring material/ all coloring materials × 100 [%] | 15.0 | 15.0 | 15.0 | 20.0 | 20.0 | 15.0 | 15.0 | 15.0 | 19.0 |
| Third coloring material/ all coloring materials × 100 [%] | 10.0 | 10.0 | 10.0 | 25.0 | 25.0 | 20.0 | 20.0 | 25.0 | 20.0 |
| Second coloring material/ third coloring material [times] | 1.5 | 1.5 | 1.5 | 0.8 | 0.8 | 0.8 | 0.8 | 0.6 | 0.95 |

(*1) Product of Kawaken Fine Chemicals Co., Ltd.

TABLE 5

Compositions of Inks of Examples (unit for components shown in upper column: parts by mass)

| | Example | | | | | | | |
|---|---|---|---|---|---|---|---|---|
| | 10 | 11 | 12 | 13 | 14 | 15 | 16 | 17 |
| Exemplified Compound I-3 (M: lithium) | | | | | | | | |
| Exemplified Compound I-5 (M: lithium) | 3.65 | 2.25 | 2.20 | 3.80 | 1.50 | 3.50 | 3.00 | 2.75 |
| Exemplified Compound II-1 (M: sodium) | 0.675 | 1.25 | 2.05 | 1.00 | 0.60 | 0.65 | 0.75 | 0.75 |
| Exemplified Compound II-9 (M: sodium) | | | | | | | | |
| Exemplified Compound III-6 (sodium salt) | | | | | | | | |
| Exemplified Compound II-17 (sodium salt) | 0.675 | 1.50 | 0.75 | 0.20 | 2.90 | 0.85 | 1.25 | 1.50 |
| C.I. Direct Red 84 | | | | | | | | |
| Ethylene glycol | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 |

TABLE 5-continued

Compositions of Inks of Examples (unit for components shown in upper column: parts by mass)

| | Example | | | | | | | |
|---|---|---|---|---|---|---|---|---|
| | 10 | 11 | 12 | 13 | 14 | 15 | 16 | 17 |
| Acetylenol E100 (*1) | 1.00 | 1.00 | 1.00 | 1.00 | 1.00 | 1.00 | 1.00 | 1.00 |
| Pure water | 76.0 | 76.0 | 76.0 | 76.0 | 76.0 | 76.0 | 76.0 | 76.0 |
| Content of first coloring material [%] | 3.65 | 2.25 | 2.20 | 3.80 | 1.50 | 3.50 | 3.00 | 2.75 |
| Content of second coloring material [%] | 0.675 | 1.25 | 2.05 | 1.00 | 0.60 | 0.65 | 0.75 | 0.75 |
| Content of third coloring material [%] | 0.675 | 1.50 | 0.75 | 0.20 | 2.90 | 0.85 | 1.25 | 1.50 |
| Total content of coloring materials [%] | 5.00 | 5.00 | 5.00 | 5.00 | 5.00 | 5.00 | 5.00 | 5.00 |
| First coloring material/ all coloring materials × 100 [%] | 73.0 | 45.0 | 44.0 | 76.0 | 30.0 | 70.0 | 60.0 | 55.0 |
| Second coloring material/ all coloring materials × 100 [%] | 13.5 | 25.0 | 41.0 | 20.0 | 12.0 | 13.0 | 15.0 | 15.0 |
| Third coloring material/ all coloring materials × 100 [%] | 13.5 | 30.0 | 15.0 | 4.0 | 58.0 | 17.0 | 25.0 | 30.0 |
| Second coloring material/ third coloring material [times] | 1.0 | 0.8 | 2.7 | 5.0 | 0.2 | 0.8 | 0.6 | 0.5 |

(*1) Product of Kawaken Fine Chemicals Co., Ltd.

TABLE 6

Compositions of Inks of Comparative Examples (unit for components shown in upper column: parts by mass)

| | Comparative Example | | | | | | | |
|---|---|---|---|---|---|---|---|---|
| | 1 | 2 | 3 | 4 | 5 | 6 | 7 | 8 |
| Exemplified Compound I-3 (M: lithium) | | | | | | | | |
| Exemplified Compound I-5 (M: lithium) | | 5.00 | | 2.50 | 2.50 | | 3.00 | 2.25 |
| Exemplified Compound II-1 (M: sodium) | | | 5.00 | | 2.50 | 2.50 | 2.00 | 1.25 |
| Exemplified Compound II-9 (M: sodium) | | | | | | | | |
| Exemplified Compound III-6 (sodium salt) | | | | | | | | |
| Exemplified Compound II-17 (sodium salt) | 5.00 | | | 2.50 | | 2.50 | | |
| C.I. Direct Red 84 | | | | | | | | 1.50 |
| Ethylene glycol | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 | 1.00 |
| Pure water | 76.00 | 76.00 | 76.00 | 76.00 | 76.00 | 76.00 | 76.00 | 76.00 |
| Content of first coloring material [%] | 0.00 | 5.00 | 0.00 | 2.50 | 2.50 | 0.00 | 3.00 | 2.25 |
| Content of second coloring material [%] | 0.00 | 0.00 | 5.00 | 0.00 | 2.50 | 2.50 | 2.00 | 1.25 |
| Content of third coloring material [%] | 5.00 | 0.00 | 0.00 | 2.50 | 0.00 | 2.50 | 0.00 | 0.00 |
| Total content of coloring materials [%] | 5.00 | 5.00 | 5.00 | 5.00 | 5.00 | 5.00 | 5.00 | 5.00 |
| First coloring material/ all coloring materials × 100 [%] | 0.0 | 100.0 | 0.0 | 50.0 | 50.0 | 0.0 | 60.0 | 45.0 |
| Second coloring material/ all coloring materials × 100 [%] | 0.0 | 0.0 | 100.0 | 0.0 | 50.0 | 50.0 | 40.0 | 25.0 |

TABLE 6-continued

Compositions of Inks of Comparative Examples
(unit for components shown in upper column: parts by mass)

| | Comparative Example | | | | | | | |
|---|---|---|---|---|---|---|---|---|
| | 1 | 2 | 3 | 4 | 5 | 6 | 7 | 8 |
| Third coloring material/ all coloring materials × 100 [%] | 100.0 | 0.0 | 0.0 | 50.0 | 0.0 | 50.0 | 0.0 | 0.0 |
| Second coloring material/ third coloring material [times] | 0.0 | — | — | 0.0 | — | 1.0 | — | — |

(*1) Product of Kawaken Fine Chemicals Co., Ltd.

<Evaluation>

(1) Color Tone of Initial Image:

Each of the inks of examples and comparative examples obtained above was charged into an ink jet recording apparatus (trade name: PIXUS iP8600; manufactured by Canon Inc.). Recording conditions were set to 23° C. in temperature, 55% in relative humidity, 2,400 dpi×1,200 dpi in recording density and 2.5 pL in ejection quantity. Images were respectively formed on a recording medium PR-101 (product of Canon Inc.) at recording duties of 100%, 80%, 60%, 40%, 20% and 10%, and the obtained images were air-dried for 24 hours at a temperature of 23° C. and a relative humidity of 55%. With respect to image portions of the recorded articles thus obtained, a* and b* in the L*a*b* color space prescribed by CIE (International Commission on Illumination) were measured to evaluate initial images as to color tone. Incidentally, a* and b* were measured by means of a spectrophotometer (trade name: Spectrolino; manufactured by Gretag Macbeth Co.) under conditions of a light source: D50 and an angle of field: 2°. The evaluation standard of the color tone of the initial image is as follows. The evaluation results are shown in Table 7. In the present invention, an image with rank B or better in terms of the following evaluation standard is regarded as a favorable image having a neutral color tone.

AA: the images at the recording duties of 100%, 80%, 60%, 40%, 20% and 10% satisfied $-5 \leq a^* \leq 5$ and $-5 \leq b^* \leq 5$;

A: the image at the recording duty of 100 satisfied $-5 \leq a^* \leq 5$ and $-5 \leq b^* \leq 5$, and the images at the recording duties of 80%, 60%, 40%, 20% and 10% satisfied $-10 \leq a^* \leq 10$ and $-10 \leq b^* \leq 10$;

B: the image at the recording duty of 100 satisfied $-5 \leq a^* \leq 5$ and $-5 \leq b^* \leq 5$, but at least one of the images at the recording duties of 80%, 60%, 40%, 20% and 10% did not satisfy $-10 \leq a^* \leq 10$ and $-10 \leq b^* \leq 10$;

C: the image at the recording duty of 100 did not satisfy $-5 \leq a^* \leq 5$ and $-5 \leq b^* \leq 5$.

(2) Light Fastness:

With respect to the each image at the recording duty of 100% obtained above, the optical density (spectral sensitivity characteristic; using ISO Status A) of black was measured (referred to as "optical density before test"). These recorded articles were each exposed to light by means of a super-xenon tester (trade name: SX-75; manufactured by SUGA TEST INSTRUMENTS CO., LTD.) for 100 hours at 100 klx in irradiation intensity, 24° C. in vessel temperature and 60% in relative humidity. With respect to the image at the recording duty of 100%, the optical density (spectral sensitivity characteristic; using ISO Visual) of black was then measured again (referred to as "optical density after test"). Incidentally, the optical density was measured by means of a spectrophotometer (trade name: Spectrolino; manufactured by Gretag Macbeth Co.) under conditions of a light source: D50 and an angle of field: 2°. The residual ratio of optical density was calculated out from the respective values of the optical densities before and after the test based on the following equation to made evaluation as to light fastness. The evaluation standard of the light fastness is as follows. The evaluation results are shown in Table 7.

Residual ratio of optical density [%]=(Optical density after test)/(Optical density before test)×100

AA: Retention rate of optical density was 95% or more;

A: Retention rate of optical density was 90% or more and less than 95%;

B: Retention rate of optical density was 85% or more and less than 90%;

C: Retention rate of optical density was less than 85%.

(3) Color Tone After Light Fastness Test:

With respect to the color tone of each image after the light fastness test in the above item (2), a* and b* were measured under the same conditions as in the above item (1) and evaluated the color tone. The evaluation standard of the color tone after the light fastness test is the same as in the above item (1). The evaluation results are shown in Table 7. In the present invention, an image with rank B or better in terms of the evaluation standard is regarded as a favorable image having a neutral color tone.

TABLE 7

Evaluation results of Examples and Comparative Examples

| | | Color tone of initial image | Light fastness | Color tone after light fastness test |
|---|---|---|---|---|
| Example | 1 | A | A | A |
| | 2 | A | A | A |
| | 3 | A | A | A |
| | 4 | AA | A | A |
| | 5 | AA | A | A |
| | 6 | AA | A | A |
| | 7 | AA | A | A |
| | 8 | AA | A | A |
| | 9 | AA | A | A |

TABLE 7-continued

Evaluation results of Examples and Comparative Examples

|  |  | Color tone of initial image | Light fastness | Color tone after light fastness test |
|---|---|---|---|---|
|  | 10 | A | A | A |
|  | 11 | A | A | B |
|  | 12 | B | A | B |
|  | 13 | B | A | B |
|  | 14 | B | A | B |
|  | 15 | AA | A | A |
|  | 16 | AA | A | A |
|  | 17 | A | A | A |
| Comparative Examples | 1 | C | AA | C |
|  | 2 | C | A | C |
|  | 3 | C | B | C |
|  | 4 | C | A | C |
|  | 5 | B | B | C |
|  | 6 | C | A | C |
|  | 7 | B | B | C |
|  | 8 | B | A | C |

(4) Residual Ratio of Optical Density in Each Wavelength Region:

The inks of Examples 3 and 12, and the ink of Comparative Example 7 were respectively used to form images at a recording duty of 100% (amount of ink applied to a recording medium: 11 g/m$^2$) (referred to as "image before light fastness test). Thus obtained images were exposed to light for 100 hours under conditions of 100 klx in xenon irradiation intensity, 24° C. in vessel temperature and 60% in relative humidity to obtain images subjected to a light fastness test (referred to as "image after light fastness test") and the images after the light fastness test were obtained. With respect to the images before and after the light fastness test, optical densities of respective components of yellow, magenta and cyan, which are prescribed by the spectral sensitivity characteristic (ISO Status A) in respective wavelength of yellow, magenta and cyan were respectively measured. Incidentally, the optical density was measured by means of a spectrophotometer (trade name: Spectrolino; manufactured by Gretag Macbeth Co.) using the spectral sensitivity characteristic (ISO Status A) under conditions of a light source: D50 and an angle of field: 2°. Residual ratios of optical density in the yellow, magenta and cyan components were calculated out (a calculating method of the residual ratio in each component is the same as in the above-described residual ratio of optical density). The difference between the maximum value and the minimum value of the residual ratios of optical density in the respective color components was found. The results are shown in Table 8.

TABLE 8

Evaluation results as to light fastness

|  | Residual ratio of optical density in respective wavelength regions | | | Difference between maximum value and minimum value of residual ratios of optical density in respective wavelength regions |
|---|---|---|---|---|
|  | Cyan component | Magenta component | Yellow component | |
| Example 3 | 93% | 94% | 93% | 1% |
| Example 12 | 89% | 93% | 93% | 4% |
| Comp. Example 7 | 86% | 88% | 93% | 7% |

As apparent from Table 8, the difference between the maximum value and the minimum value of the residual ratios of optical density in the respective wavelength regions of yellow, magenta and cyan in Example 3 is 1%. On the other hand, the difference between the maximum value and the minimum value of the residual ratios of optical density in Example 12 is 4%, and the difference between the maximum value and the minimum value of the residual ratios of optical density in Comparative Example 7 is as great as 7%. When the difference between the maximum value and the minimum value of the residual ratios of optical density in the respective wavelength regions of yellow, magenta and cyan is small like Example 3, namely, the degree of lowering of the optical density is small, change of color tone after the image is exposed to light and faded becomes little. As a result, an excellent image having a color tone close to a neutral color tone can be retained even after the light fastness test.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-177459, filed Jul. 5, 2007, and No. 2008-142279, May 30, 2008, which are hereby incorporated by reference herein in their entirety.

What is claimed is:

1. An ink comprising a first coloring material, a second coloring material and a third coloring material, wherein the first coloring material is a compound represented by the following general formula (I), the second coloring material is a compound represented by the following general formula (II), and the third coloring material is a compound represented by the following general formula (III):

General formula (I)

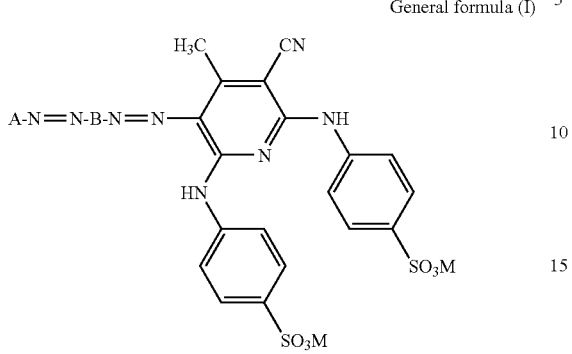

wherein A is an aromatic or heterocyclic group which may be substituted, B is any group represented by the following general formulae (1) to (5), and M's are, independently of each other, a hydrogen atom, alkali metal, ammonium or organic ammonium, General formula (1)

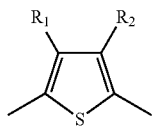

General formula (2)

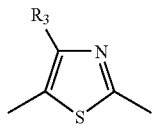

General formula (3)

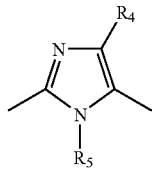

General formula (4)

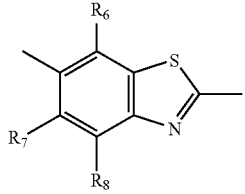

General formula (5)

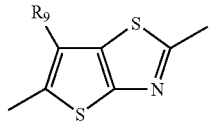

wherein $R_1$ to $R_9$ are, independently of one another, a hydrogen atom, halogen atom, aliphatic group, aromatic group, heterocyclic group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group containing an anilino group or heterocyclic amino group, acylamino group, ureido group, sulfamoylamino group, alkoxycarbonylamino group, aryloxycarbonylamino group, alkyl- or arylsulfonylamino group, heterocyclic sulfonylamino group, cyano group, nitro group, alkyl- or arylthio group, heterocyclic thio group, alkyl- or arylsulfonyl group, heterocyclic sulfonyl group, alkyl- or arylsulfinyl group, heterocyclic sulfinyl group, sulfamoyl group, or sulfonic group with the proviso that each group may be further substituted;

General formula (II)

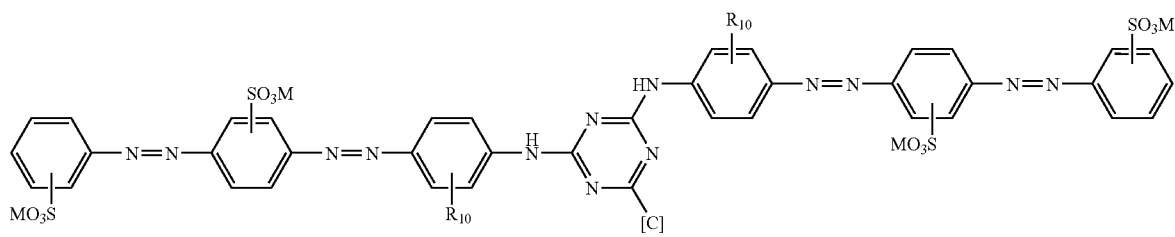

wherein groups $R_{10}$ are, independently of each other, a hydrogen atom, a hydroxyl group, a carboxyl group, an alkyl group having 1 to 4 carbon atoms, which may be substituted by a hydroxyl group or an alkoxy group having 1 to 4 carbon atoms, an alkoxy group having 1 to 4 carbon atoms, which may be substituted by a hydroxyl group or an alkoxy group having 1 to 4 carbon atoms, an alkylamino group having 1 to 4 carbon atoms, which may be substituted by a hydroxyl group or an alkoxy group having 1 to 4 carbon atoms, a carboxy-(C1-C5)alkylamino group, a bis[carboxy-(C1-C5)alkyl]amino group, an alkanoylamino group having 1 to 4 carbon atoms, which may be substituted by a hydroxyl group or an alkoxy group having 1 to 4 carbon atoms, a phenylamino group, which may be substituted by a carboxyl, sulfonic or amino group, a sulfonic group, a halogen atom, or a ureido group, C is an aliphatic amine residue having a carboxyl or sulfonic group, and M's are, independently of one another, a hydrogen atom, alkali metal, ammonium or organic ammonium; and General formula (III)

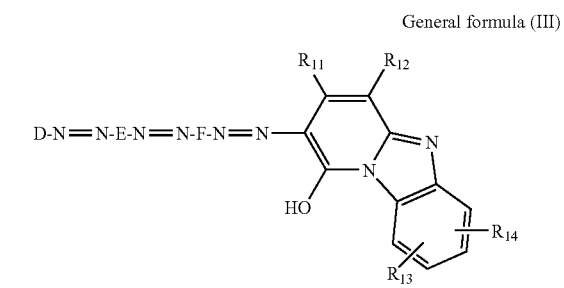

wherein D is a phenyl group having a substituent selected from the group consisting of a carboxyl group, a sulfonic group, a chlorine atom, a cyano group, a nitro group, a sulfamoyl group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group, E and F are, independently of each other, a paraphenylene group having a substituent selected from the group consisting of a carboxyl group, a sulfonic group, an alkyl group having 1 to 4 carbon atoms, an alkoxy group having 1 to 4 carbon atoms, which may be substituted by a hydroxyl group, an alkoxy group having 1 to 4 carbon atoms, a sulfonic group or a carboxyl group, and an alkylsulfonyl group having 1 to 4 carbon atoms, which may be substituted by a hydroxyl group, sulfonic group or carboxyl group, $R_{11}$ is an alkyl group having 1 to 4 carbon atoms, which may be substituted by a carboxyl group, a phenyl group, which may be substituted by a sulfonic group, or a carboxyl group, $R_{12}$ is a cyano group, carbamoyl group or carboxyl group, and $R_{13}$ and $R_{14}$ are, independently of each other, a hydrogen atom, methyl group, chlorine atom or sulfonic group.

2. The ink according to claim 1, wherein in the compound represented by the general formula (I), A is a naphthyl group which may be substituted, and B is a group represented by the general formula (2).

3. The ink according to claim 1, wherein in the compound represented by the general formula (III), the substituent of D is a sulfonic or carboxyl group, and E and F are groups represented by the following general formula (6):

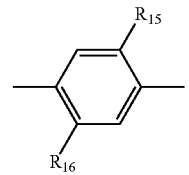

wherein $R_{15}$ is a sulfonic or sulfopropoxy group, and $R_{16}$ is a hydrogen atom, methyl group, ethyl group, methoxy group or ethoxy group.

4. The ink according to claim 1, wherein the content (% by mass) of the first coloring material in the ink is 45.0% or more and 75.0% or less based on the total content (% by mass) of all the coloring materials in the ink.

5. The ink according to claim 1, wherein the content (% by mass) of the second coloring material in the ink is more than 12.0% and 40.0% or less based on the total content (% by mass) of all the coloring materials in the ink.

6. The ink according to claim 1, wherein the content (% by mass) of the first coloring material in the ink is 50.0% or more based on the total content (% by mass) of all the coloring materials in the ink, and the content of the second coloring material in the ink is 0.60 times or more and less than 1.00 time in terms of mass ratio to the content (% by mass) of the third coloring material in the ink.

7. The ink according to claim 1, wherein the difference between a maximum value and a minimum value of residual ratios of optical density of yellow, magenta and cyan components (residual ratio of optical density represented by the following equation when optical densities of yellow, magenta and cyan components prescribed by the spectral sensitivity characteristic of ISO Status A are respectively determined) with an image before a light fastness test formed with an amount of the ink applied to a recording medium set to be 11 g/m² and the image after the light fastness test which has been exposed to light for 100 hours under conditions of 100 klx in xenon irradiation intensity, 24° C. in temperature and 60% in relative humidity is 0 or more and 5 or less:

residual ratio of optical density [%]=(Optical density after test)/(Optical density before test)×100.

8. The ink according to claim 1, wherein the compound represented by the general formula (I) as the first coloring material, the compound represented by the general formula (II) as the second coloring material and the compound represented by the general formula (III) as the third coloring material have the same solubilizing group in the same number.

9. An ink jet recording method comprising a step of ejecting an ink by an ink jet system to conduct recording on a recording medium, wherein the ink is the ink according to claim 1.

10. An ink cartridge comprising an ink storage portion for storing an ink, wherein the ink is the ink according to claim 1.

11. A recording unit comprising an ink storage portion for storing an ink and a recording head for ejecting the ink, wherein the ink is the ink according to claim 1.

12. An ink jet recording apparatus comprising an ink storage portion for storing an ink and a recording head for ejecting the ink, wherein the ink is the ink according to claim 1.

* * * * *